(12) United States Patent
Qiu et al.

(10) Patent No.: US 7,709,092 B2
(45) Date of Patent: May 4, 2010

(54) SOLAR CONTROL MULTILAYER FILM

(75) Inventors: Zai-Ming Qiu, Woodbury, MN (US); Raghunath Padiyath, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 744 days.

(21) Appl. No.: 11/625,001

(22) Filed: Jan. 19, 2007

(65) Prior Publication Data

US 2008/0176973 A1    Jul. 24, 2008

(51) Int. Cl.
    B32B 9/04    (2006.01)
(52) U.S. Cl. .................. 428/422; 428/421; 428/447
(58) Field of Classification Search ............ 428/421, 428/422, 447; 528/43; 526/242, 279
    See application file for complete search history.

(56) References Cited

U.S. PATENT DOCUMENTS

| | | |
|---|---|---|
| 2,676,182 A | 4/1954 | Daudt |
| 2,823,218 A | 2/1958 | Speier |
| 2,915,544 A | 12/1959 | Holbrook |
| 2,970,150 A | 1/1961 | Bailey |
| 3,159,601 A | 12/1964 | Ashby |
| 3,159,662 A | 12/1964 | Ashby |
| 3,220,972 A | 11/1965 | Lamoreaux |
| 3,250,808 A | 5/1966 | Moore |
| 3,516,946 A | 6/1970 | Modic |
| 3,610,724 A | 10/1971 | Frizzell |
| 3,711,176 A | 1/1973 | Alfrey |
| 3,814,730 A | 6/1974 | Karstedt |
| 4,029,629 A | 6/1977 | Jeram |
| 4,262,072 A | 4/1981 | Wendling |
| 4,446,305 A | 5/1984 | Rogers |
| 4,455,205 A | 6/1984 | Olson |
| 4,478,876 A | 10/1984 | Chung |
| 4,486,504 A | 12/1984 | Chung |
| 4,491,508 A | 1/1985 | Olson |
| 4,504,645 A | 3/1985 | Melancon |
| 4,510,094 A | 4/1985 | Drahnak |
| 4,530,879 A | 7/1985 | Drahnak |
| 4,533,575 A | 8/1985 | Melancon |
| 4,540,623 A | 9/1985 | Im |
| 4,584,355 A | 4/1986 | Blizzard |
| 4,585,836 A | 4/1986 | Homan |
| 4,591,622 A | 5/1986 | Blizzard |
| 4,654,233 A | 3/1987 | Grant |
| 4,855,184 A | 8/1989 | Klun |
| 5,126,394 A | 6/1992 | Revis |
| 5,145,886 A | 9/1992 | Oxman |
| 5,258,225 A | 11/1993 | Katsamberis |
| 5,448,404 A | 9/1995 | Schrenk |
| 5,648,407 A | 7/1997 | Goetz |
| 5,677,050 A | 10/1997 | Bilkadi |
| 5,688,884 A | 11/1997 | Baker |
| 5,741,552 A | 4/1998 | Takayama |
| 5,882,774 A | 3/1999 | Jonza |
| 6,045,894 A | 4/2000 | Jonza |
| 6,087,010 A * | 7/2000 | Yoshida et al. .............. 428/421 |
| 6,224,949 B1 | 5/2001 | Wright |
| 6,238,798 B1 | 5/2001 | Kang |
| 6,261,684 B1 * | 7/2001 | Takahashi et al. ........... 428/345 |
| 6,299,799 B1 | 10/2001 | Craig |
| 6,329,058 B1 | 12/2001 | Arney |
| 6,352,761 B1 | 3/2002 | Hebrink |
| 6,353,037 B1 | 3/2002 | Thunhorst |
| 6,368,699 B1 | 4/2002 | Gilbert |
| 6,376,569 B1 | 4/2002 | Oxman |
| 6,376,590 B2 | 4/2002 | Kolb |
| 6,451,869 B1 | 9/2002 | Butts |
| 6,462,100 B1 | 10/2002 | Thunhorst |
| 6,531,230 B1 | 3/2003 | Weber |
| 6,565,770 B1 | 5/2003 | Mayer et al. |
| 6,572,784 B1 | 6/2003 | Coombs et al. |
| 6,797,396 B1 | 9/2004 | Liu |
| 6,911,254 B2 | 6/2005 | Fisher et al. |
| 6,991,695 B2 | 1/2006 | Tait |
| 7,099,083 B2 * | 8/2006 | Johnson et al. ............. 359/500 |
| 7,101,618 B2 * | 9/2006 | Coggio et al. .............. 428/336 |
| 2001/0022982 A1 | 9/2001 | Neavin |
| 2002/0128336 A1 | 9/2002 | Kolb |
| 2003/0012936 A1 | 1/2003 | Draheim |
| 2004/0077775 A1 | 4/2004 | Audenaert |
| 2006/0148350 A1 | 7/2006 | Chang |
| 2006/0148950 A1 | 7/2006 | Davidson |
| 2006/0154049 A1 * | 7/2006 | Padiyath et al. ............. 428/328 |
| 2007/0013998 A1 * | 1/2007 | Wu et al. .................... 359/361 |
| 2008/0292820 A1 * | 11/2008 | Padiyath et al. .............. 428/34 |
| 2009/0068384 A1 * | 3/2009 | Seth et al. ................... 428/34 |

FOREIGN PATENT DOCUMENTS

| | | |
|---|---|---|
| WO | WO 95/17303 | 6/1995 |
| WO | WO 99/39224 | 8/1999 |

OTHER PUBLICATIONS

P. Tarrant et al., J. Am. Chem. Soc., vol. 79, pp. 6536-6540, 1957.
A.M. Geyer et al., J. Chem. Soc., pp. 4472-4479, 1957.
YK Kim et al., J. Org. Chem., vol. 38, pp. 1615-1616, 1973.
E. Beyou et al., Tet. Letters, vol. 36(11), pp. 1843-1844, 1995.
Edward Cohen and Edgar Gutoff, Modern Coating and Drying Technology, VCH Publishers, NY 1992, ISBN 3-527-28246-7.
Gutoff and Cohen, Coating and Drying Defects: Troubleshooting Operating Problems, Wiley Interscience, NY ISBN 0-471 59810-0.
W. Posthumus et al., Journal of Colloid and Interface Science 304 (2006), 394-401.
A.A. Thorpe et al., Journal of Flourine Chemistry 104 (2000) 27-45.

* cited by examiner

*Primary Examiner*—Margaret G Moore
(74) *Attorney, Agent, or Firm*—Jeffrey M. Olofson

(57) ABSTRACT

A multilayer film article is disclosed. The multilayer film article includes an infrared light reflecting multilayer film having alternating layers of a first polymer type and a second polymer type, a hardcoat layer that is the reaction product of a hardcoat composition that includes at least one organic polyethylenically unsaturated compound, at least one fluoroalkyl pendent siloxane compound, infrared light absorbing nanoparticles, and a polymerization initiator. The hardcoat layer being disposed adjacent the multilayer film.

30 Claims, 2 Drawing Sheets

SOLAR CONTROL MULTILAYER FILM

BACKGROUND

The invention generally relates to solar control multilayer film. The invention more particularly relates to solar control multilayer film having a hardcoat layer that includes infrared absorbing nanoparticles and at least one fluoro-silicone-containing compound that imparts desirable properties.

Dyed and vacuum-coated plastic films have been applied to windows to reduce heat load due to sunlight. To reduce heat load, solar transmission is blocked in either the visible or the infrared portions of the solar spectrum, i.e., at wavelengths ranging from 400 nm to 2500 nm or greater.

Primarily through absorption, dyed films can control the transmission of visible light and consequently provides glare reduction. However, dyed films generally do not block near-infrared solar energy and consequently are not completely effective as solar control films. Dyed films also often fade with solar exposure, in addition, when films are colored with multiple dyes, the dyes often fade at different rates, causing an unwanted color changes over the life of the film.

Other known window films are fabricated using vacuum-deposited grey metals, such as stainless steel, inconel, monel, chrome, or nichrome alloys. The deposited grey metal films offer about the same degrees of transmission in the visible and infrared portions of the solar spectrum. As a result, the grey metal films are an improvement over dyed films with regard to solar control. The grey metal films are relatively stable when exposed to light, oxygen, and/or moisture, and in those cases in which the transmission of the coatings increases due to oxidation, color changes are generally not detectable. After application to clear glass, grey metals block light transmission by approximately equal amounts of solar reflection and absorption.

Vacuum-deposited layers such as silver, aluminum, and copper control solar radiation primarily by reflection and are useful only in a limited number of applications due to the high level of visible reflectance. A modest degree of selectivity (i.e., higher visible transmission than infrared transmission) is afforded by certain reflective materials, such as copper and silver.

There is a need for improved solar control film that has a high visible light transmission and substantially blocks infrared radiation, and has desirable cleaning and scratch resistant properties.

SUMMARY

The invention includes an article including an infrared light reflecting multilayer film having alternating layers of a first polymer type and a second polymer type; and a hardcoat layer disposed on the multilayer film, wherein said hardcoat layer includes the reaction product of a mixture that includes at least one organic polyethylenically unsaturated compound, at least one fluoroalkyl pendent siloxane compound, infrared light absorbing nanoparticles, and at least one polymerization initiator.

The invention also includes articles with a hardcoat layer formed from a hardcoat composition where the at least one fluoroalkyl pendent siloxane compound is:

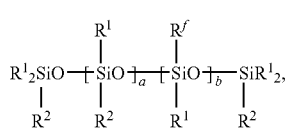
(Formula I)

wherein
$R^1$ is a monovalent hydrocarbyl organic group;
$R^2$ is $R^1$ or an ethylenically or multi-ethylenically unsaturated group Z;
$R^f$ is a fluoroalkyl group, or a perfluorpolyether group;
a is 0 to 2000;
b is 1 to 2000;
with the proviso that a+b is at least 5, and at least two of said $R^2$ groups are Z.

The invention also includes articles with a hardcoat layer formed from a hardcoat composition where the at least one fluoroalkyl pendent siloxane compound is:

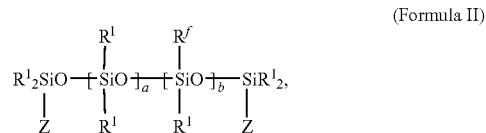
(Formula II)

wherein $R^1$, $R^f$, Z, a, and b are as defined above.

The invention also includes articles with a hardcoat layer formed from a hardcoat composition where the at least one fluoroalkyl pendent siloxane compound is:

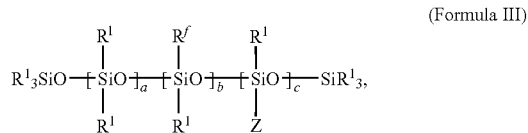
(Formula III)

wherein $R^1$, $R^f$, Z, a, and b are as defined above; and
c is 2 to 2000,
with the proviso that a+b+c is at least 5.

The invention also includes articles with a hardcoat layer formed from a hardcoat composition where the at least one fluoroalkyl pendent siloxane compound is:

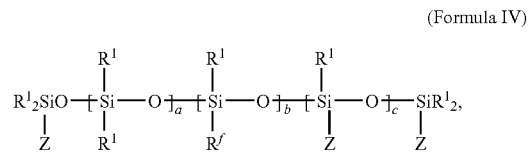
(Formula IV)

wherein $R^1$, Z, a, and b are as defined above; and
c is 2 to 2000,
with the proviso that a+b+c is at least 5.

The invention also includes articles with a hardcoat layer formed from a hardcoat composition where the at least one fluoroalkyl pendent siloxane compound is;

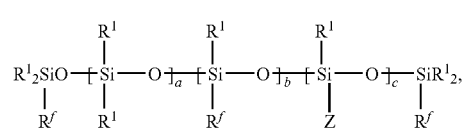
(Formula V)

wherein $R^1$, $R^f$, Z, a, and b are as defined above; and
c is 2 to 2000.
with the proviso that a+b+c is at least 5.

The invention also includes articles with a hardcoat layer formed from a hardcoat composition where the at least one fluoroalkyl pendent siloxane compound is (CH$_2$=CH)Si(Me)$_2$O—[Si(Me)(C$_2$H$_4$CF$_3$)—O]$_b$—Si(Me)$_2$(CH=CH$_2$), (CH$_2$=CH)Si(Me)$_2$O—[(Si(Me)$_2$-O]$_a$—[Si(Me)(C$_2$H$_4$C$_4$F$_9$)—O]$_b$—Si(Me)$_2$(CH=CH$_2$), (CH$_2$=CH)Si(Me)$_2$O—[Si(Me)$_2$-O]$_a$—[Si(Me)(C$_2$H$_4$CF$_3$)—O]$_b$—Si(Me)$_2$(CH=CH$_2$), (CH$_2$=CH)Si(Me)$_2$O—[Si(Me)(C$_2$H$_4$F$_9$)—O]$_b$—Si(Me)$_2$(CH=CH$_2$), or combinations thereof.

The invention also includes articles with a hardcoat layer formed from a hardcoat composition where the at least one fluoroalkyl pendent siloxane compound is: (CH$_2$=CH)Si(Me)$_2$O—[Si(Me)$_2$-O]$_a$—[Si(Me)(C$_2$H$_4$C$_4$F$_9$)O]$_b$—[Si(Me)(CH=CH$_2$)—O]$_c$—(Si(Me)$_2$(CH=CH$_2$), (CH$_2$=CH)Si(Me)$_2$O—[Si(Me)$_2$-O]$_a$—[Si(Me)(C$_2$H$_4$CF$_3$)—O]$_b$—[Si(Me)(CH=CH$_2$)—O]$_c$—Si(Me)$_2$(CH=CH$_2$), (Me)$_3$SiO—[Si(Me)$_2$-O]$_a$—[Si(Me)(C$_2$H$_4$CF$_3$)—O]$_b$—[Si(Me)(CH=CH$_2$)—O]$_c$—Si(Me)$_3$, (Me)$_3$SiO—[Si(Me)$_2$-O]$_a$—[Si(Me)(C$_2$H$_4$C$_4$F$_9$)—O]$_b$—[Si(Me)(CH=CH$_2$)—O]$_c$—Si(Me)$_3$, (Me)$_3$SiO—[Si(Me)(C$_2$H$_4$C$_4$F$_9$)—O]$_b$—[Si(Me)(CH=CH$_2$)—O]$_b$—Si(Me)$_3$, (Me)$_3$SiO—[Si(Me)(C$_2$H$_4$CF$_3$)—O]$_b$—[Si(Me)(CH=CH$_2$)—O]$_c$—Si(Me)$_3$, (Me)$_3$SiO—[Si(Me)(C$_2$H$_4$C$_4$F$_9$)—O]$_b$—[Si(Me)(C$_2$H$_4$CO$_2$C(Et)(CH$_2$OC(O)CH=CH$_2$)$_2$))—O]$_c$—Si(Me)$_3$, (Me)$_3$SiO—[Si(Me)(C$_3$H$_6$NHC(O)HFPO)—O]$_b$—[Si(Me)(C$_2$H$_4$CO$_2$C((Et)(CH$_2$OC(O)CH=CH$_2$)$_2$))—O]$_c$—Si(Me)$_3$, (Me)$_3$SiO—[Si(Me)(CH$_2$CH$_2$C(O)OC$_2$H$_4$OC(O)HFPO)—O]$_b$—[Si(Me)(C$_2$H$_4$CO$_2$C((Et)(CH$_2$OC(O)CH=CH$_2$)$_2$))—O]$_c$—Si(Me)$_3$, (Me)$_3$SiO—[Si(Me)(CH$_2$CHMeC(O)OC$_2$H$_4$OC(O)HFPO)—O]$_b$—[Si(Me)(C$_2$H$_4$CO$_2$C((Et)(CH2C(O)CH=CH$_2$)$_2$))—O]$_c$—Si(Me)$_3$, (C$_4$F$_9$CH$_2$)Si(Me)$_2$O—[Si(Me)(C$_2$H$_4$C$_4$F$_9$)—O]$_b$—[Si(Me)(CH=CH$_2$)—O]$_c$—Si(Me)$_2$(CH$_2$CH$_2$C$_4$F$_9$), or combinations thereof.

The invention also includes articles with a hardcoat layer formed from a hardcoat composition where the at least one fluoroalkyl pendent siloxane compound is:

(Formula VI)

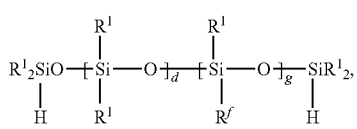

wherein R$^1$ is a monovalent, hydrocarbyl organic group;
R$^3$ is H or R$^1$;
R$^f$ is a fluoroalkyl group, or a perfluorpolyether group;
d is 0 to 2000;
e is 0 to 2000;
g is 1 to 2000;
with the proviso that d+e+g is at least 5, and at least two of said R$^3$ groups are H.

The invention also includes articles with a hardcoat layer formed from a hardcoat composition where the at least one fluoroalkyl pendent siloxane compound is:

(Formula VII)

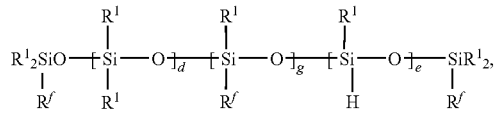

wherein R$^1$, R$^f$, d, and g are as defined above, with the proviso that d+g is at least 5.

The invention also includes articles with a hardcoat layer formed from a hardcoat composition where the at least one fluoroalkyl pendent siloxane compound is:

(Formula VIII)

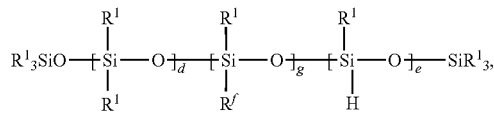

wherein R$^1$, R$^S$, R$^f$, d, e, and g are as defined above, with the proviso that d+e+g is at least 5.

The invention also includes articles with, a hardcoat layer formed from a hardcoat composition where the at least one fluoroalkyl pendent siloxane compound is:

(Formula IX)

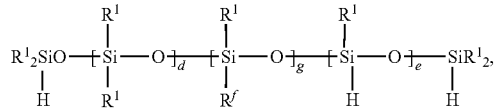

wherein R$^1$, d, e, and g are as defined above.

The invention also includes articles with a hardcoat layer formed from a hardcoat composition where the at least one fluoroalkyl pendent siloxane compound is:

(Formula X)

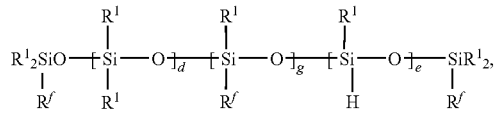

wherein R$^1$, R$^f$, d, e, and g are as defined above.

The invention also includes articles with a hardcoat layer formed from a hardcoat composition where the at least one fluoroalkyl pendent siloxane compound is: (Me)$_2$SiH—O—[Si(Me)(H)—O]$_e$—[Si(Me)(C$_2$H$_4$CF$_3$)—O]$_g$—SiH(Me)$_2$, (Me)$_2$SiH—O—[Si(Me)(H)—O]$_e$—[Si(Me)(C$_2$H$_4$C$_4$F$_9$)—O]$_g$—SiH(Me)$_2$, (Et)$_2$SiH—O—[Si(Et)(H)—O]$_e$—[Si(Me)(C$_2$H$_4$CF$_3$)—O]$_g$—SiH(Et)$_2$, (Et)$_2$SiH—O—[Si(Et)(H)—O]$_e$—[Si(Me)(C$_2$H$_4$C$_4$F$_9$)—O]$_g$—SiH(Et)$_2$, (Me)$_2$SiH—O—[Si(Me)(H)—O]$_e$—[Si(Me)(C$_2$H$_4$CF$_3$)—O]$_g$—[Si(Me)$_2$-O]$_d$—SiH(Me)$_2$, (Me)$_2$SiH—O—[Si(Me)(H)—O]$_e$—[Si(Me)(C$_2$H$_4$C$_4$F$_9$)—O]$_g$—[Si(Me)$_2$-O]$_d$—SiH(Me)$_2$, (Me)$_2$SiH—O—[Si(Me)(H)—O]$_e$—[Si(Me)(C$_2$H$_4$CF$_3$)—O]$_g$—[Si(Me)(Ph)-O]$_d$—SiH(Me)$_2$, (Me)$_2$SiH—O—[Si(Me)(H)—O]$_e$—[Si(Me)(C$_2$H$_4$C$_4$F$_9$)—O]$_g$—[Si(Me)(Ph)-O]$_d$—SiH(Me)$_2$, (Me)$_3$Si—O—[Si(Me)(H)—O]$_e$—[Si(Me)(C$_2$H$_4$CF$_3$)—O]$_g$—Si(Me)$_3$, (Me)$_3$Si—O—[Si(Me)(H)—O]$_e$—[Si(Me)(C$_2$H$_4$C$_4$F$_9$)—O]$_g$—Si(Me)$_3$, (Me)$_3$Si—O—[Si(Me)(H)—O]$_e$—[Si(Me)(C$_2$H$_4$CF$_3$)—O]$_g$—[Si(Me)$_2$-O]$_d$—Si(Me)$_3$, (Me)$_3$Si—O—[Si(Me)(H)—O]$_e$—[Si(Me)(C$_2$H$_4$F$_9$)—O]$_g$—[Si(Me)$_2$-O]$_d$—Si(Me)$_3$, (Me)$_3$Si—O—[Si(Me)(H)—O]$_e$—[Si(Me)(C$_2$H$_4$CF$_3$)—O]$_g$—[Si(Me)(Ph)-O]$_d$Si(Me)$_3$, (Me)$_3$Si—O—[Si(Me)(H)—O]$_e$—[Si(Me)(C$_2$H$_4$C$_4$F$_9$)—O]$_g$—[Si(Me)(Ph)-O]$_d$—Si(Me)$_3$, (Me)$_3$Si—O—[Si(Me)(H)—O]$_e$—[Si(Me)(CH$_2$C(H)(Me)C(O)OC$_2$H$_4$OC(O)HFPO)—O]$_g$—[Si(Me)$_2$-O]$_d$—

Si(Me)$_3$, (Me)$_3$Si—O—[Si(Me)(H)—O]$_e$—[Si(Me)(C$_3$H$_6$NHC(O)HFPO)—O]$_g$—[Si(Me)$_2$-O]$_d$—Si(Me)$_3$, (C$_4$F$_9$CH$_2$CH$_2$)Si(Me)$_2$-O—[Si(Me)(C$_2$H$_4$C$_4$F$_9$)—O]$_b$—[Si(Me)(H)—O]$_c$—Si(Me)$_2$(CH$_2$CH$_2$C$_4$F$_9$), or combinations thereof.

The invention also includes articles with a hardcoat layer formed from a hardcoat composition where the at least one fluoroalkyl pendent siloxane compound is:

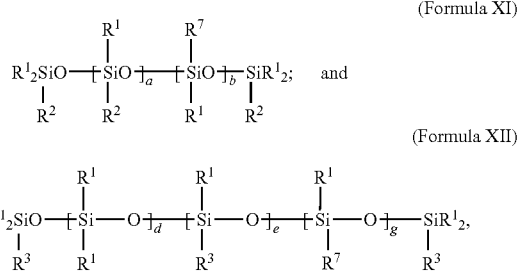

(Formula XI)

(Formula XII)

wherein R$^1$, R$^2$, R$^3$, a, b, d, e, and g are as defined above; and

R$^7$ is R$^1$ or R$^f$, where R$^1$ and R$^f$ are as defined above, with the proviso that at least one R$^7$ is R$^f$, at least two R$^2$ are Z, and at least two R$^3$ are H.

The invention also includes a light control article for blocking infrared light from an infrared light source that includes an infrared light reflecting multilayer film having alternating layers of a first polymer type and a second polymer type, a hardcoat layer disposed on the multilayer film, wherein said hardcoat layer comprises the reaction product of a hardcoat composition that includes at least one organic polyethylenically unsaturated compound, at least one fluoroalkyl pendent siloxane compound, infrared light absorbing nanoparticles, and at least one polymerization initiator; and a substrate disposed adjacent the infrared light reflecting multilayer film.

BRIEF DESCRIPTION OF THE DRAWINGS

The present application may be more completely understood in consideration of the following detailed description of various embodiments of the invention in connection with the accompanying drawings, in which.

Figure 1:
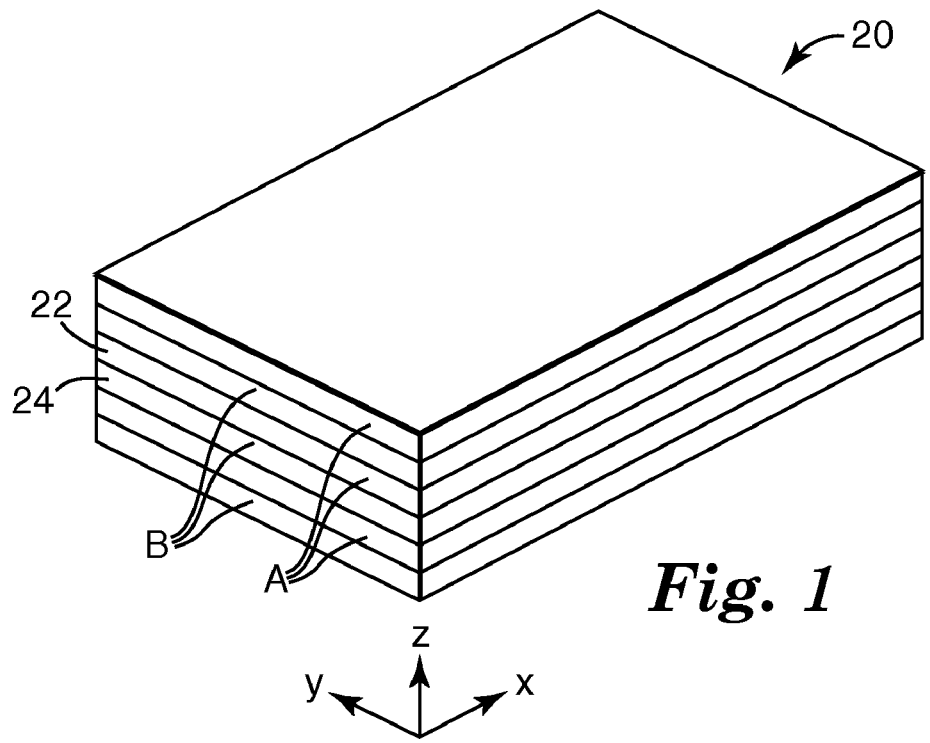
FIG. 1 is a perspective view of a multilayer film.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The solar control multilayer film is believed to be applicable to a variety of applications needing solar control including, for example, architectural and transportation applications. In some embodiments, the solar control multilayer film article includes an infrared absorbing nanoparticle layer disposed on an infrared reflecting multilayer film. In other embodiments, the solar control multilayer film article includes an infrared reflecting multilayer film disposed between an infrared absorbing nanoparticle layer and an adhesive layer. The solar control film can be adhered to an optical substrate such as, for example, a glass substrate. These examples, and the examples discussed below, provide an appreciation of the applicability of the disclosed solar control multilayer film, but should not be interpreted in a limiting sense.

The term "polymer" or "polymeric" will be understood to include polymers, copolymers (e.g., polymers formed, using two or more different monomers), oligomers and combinations thereof, as well as polymers, oligomers, or copolymers. Both block and random copolymers are included, unless indicated otherwise.

As used herein, "fluoro-silicone-containing compound" or "fluoro-silicone-containing additive"; or "fluoroalkyl pendent siloxane compound" or "fluoroalkyl pendent siloxane additive" can refer to one specific compound or a mixture of two or more compounds.

Unless otherwise noted, "HFPO—" refers to the end group F(CF(CF$_3$)CF$_2$O)$_y$CF(CF$_3$)— of the methyl ester F(CF(CF$_3$)CF$_2$O)$_y$CF(CF$_3$)C(O)OCH$_3$, wherein "y" averages 2 to 15. In some embodiments, y averages between 3 and 10 or y averages between 5 and 8. Such species generally exist as a distribution or mixture of oligomers with a range of values for y, so that the average value of y may be non-integer. In one embodiment y averages 6.2. This methyl ester has an average molecular weight of 1,211 g/mol, and can be prepared according to the method reported in U.S. Pat. No. 3,250,808 (Moore et al., with purification by fractional distillation.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The term "hard resin" or "hardcoat" means that the resulting cured polymer exhibits an elongation at break of less than 50 or 40 or 30 or 20 or 10 or 5 percent when evaluated according to the ASTM D-882-91 procedure, in some embodiments, the hard resin polymer can exhibit a tensile modulus of greater than 100 kpsi (6.89×10$^8$ pascals) when evaluated according to the ASTM D-882-91 procedure. In some embodiments, the hard resin polymer can exhibit a haze value of less than 10% or less than 5% when tested in a Taber abrader according to ASTM D 1044-99 under a load of 500 g and 50 cycles (haze can be measured with Haze-Gard Plus, BYK-Gardner, Md., haze meter).

As used in the context of the hardcoat composition, a "weight percent" or "wt-%" of a particular component refers to the amount (by weight) of the particular component in the hardcoat composition after the solvent has been removed from the hardcoat composition but before the hardcoat composition has been cured to form the hardcoat layer.

The term "adjacent" refers to one element being in close proximity to another element and includes the elements touching one another and further includes the elements being separated by one or more layers disposed between the elements.

The term "optical display", or "display panel", can refer to any conventional optical displays, including but not limited to multi-character multi-line displays such as liquid crystal displays ("LCDs"), plasma displays, front and rear projection displays, cathode ray tubes ("CRTs"), and signage, as well as single-character or binary displays such as light emitting diodes ("LEDs"), signal lamps, and switches. The exposed surface of such display panels may be referred to as a "lens." The invention is particularly useful for displays having a viewing surface that is susceptible to being touched or contacted by ink pens, markers and other marking devices, wiping cloths, paper items and the like.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" include plural referents unless the content clearly dictates otherwise. Thus, for example, reference to a composition containing "a nanoparticle layer" includes two or more nanoparticle layers. As used in this specification and the appended claims, the term "or" is generally employed in its sense including, "and/or" unless the content clearly dictates otherwise.

This disclosure generally describes multilayer film that includes an infrared absorbing nanoparticle layer disposed on a polymeric multilayer film. In many embodiments, an infrared light reflecting multilayer film has alternating layers of a first polymer type and a second polymer type, and an infrared light absorbing nanoparticle layer is adjacent the multilayer film. The nanoparticle layer includes a plurality of metal oxide nanoparticles. In some embodiments, the multilayer film is disposed adjacent to an optical substrate such as glass to form a solar control article. In some embodiments, the multilayer film has an average visible light transmission of at least 45% and an average infrared transmission for 780 nm to 2500 nm light of less than 15%.

FIG. 1 illustrates multilayer optical film 20. The film includes individual layers 22, 24. The layers have different refractive index characteristics so that some light is reflected at interfaces between adjacent layers. The layers are sufficiently thin so that light reflected at a plurality of the interfaces undergoes constructive or destructive interference in order to give the film the desired reflective or transmissive properties. For optical films designed to reflect light at ultraviolet, visible, or near-infrared wavelengths, each layer generally has an optical thickness (i.e., a physical thickness multiplied by refractive index) of less than about 1 micrometer. Thicker layers can, however, also be included, such as skin layers at the outer surfaces of the film, or protective boundary layers disposed within the film that separate packets of layers.

The reflective and transmissive properties of multilayer optical film 20 are a function of the refractive indices of the respective layers (i.e., microlayers). Each layer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y- and z-axes, respectively (see FIG. 1). In practice, the refractive indices are controlled by judicious materials selection and processing conditions. Film 20 can be made by co-extrusion of typically tens or hundreds of layers of two alternating polymers A, B, followed by optionally passing the multilayer extrudate through one or more multiplication dies, and then stretching or otherwise orienting the extrudate to form a final film. The resulting film is composed of typically tens or hundreds of individual layers whose thicknesses and refractive indices are tailored to provide one or more reflection bands in desired region(s) of the spectrum, such as in the visible, near infrared, and/or infrared. In order to achieve high reflectivity with a reasonable number of layers, adjacent layers can exhibit a difference in refractive index ($\Delta n_x$) for light polarized along the x-axis of at least 0.05. In some embodiments, if the high reflectivity is desired for two orthogonal polarizations, then the adjacent layers also exhibit, a difference in refractive index ($\Delta n_y$) for light polarized along the y-axis of at least 0.05. In other embodiments, the refractive index difference ($\Delta n_y$) can be less than 0.05 or 0 to produce a multilayer stack that reflects normally incident light of one polarization state and transmits normally incident light of an orthogonal polarization state.

If desired, the refractive index difference ($\Delta n_z$) between adjacent layers for light polarized along the z-axis can also be tailored to achieve desirable reflectivity properties for the p-polarization component of obliquely incident light. For ease of explanation, at any point of interest on a multilayer optical film the x-axis will be considered to be oriented within the plane of the film such that the magnitude of $\Delta n_x$ is a maximum. Hence, the magnitude of $\Delta n_y$ can be equal to or less than (but not greater than) the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1, 2 are chosen so that $n_{1x} \geq n_{2x}$, i.e., $\Delta n_x \geq 0$.

To maintain high reflectivity of p-polarized light at oblique angles of incidence, the z-index mismatch $\Delta n_z$ between layers can be controlled to be substantially less than the maximum in-plane refractive index difference $\Delta n_x$, such that $\Delta n_z \leq 0.5 * \Delta n_x$. In one embodiment. $\Delta n_z \leq 0.25 * \Delta n_x$. A zero or near zero magnitude z-index mismatch yields interfaces between layers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z < 0$. This condition yields interfaces whose reflectivity for p-polarized light increases with increasing angles of incidence, as is the case for s-polarized light.

Multilayer optical films have been described in, for example, U.S. Pat. No. 3,610,724 (Rogers); U.S. Pat. No. 3,711,176 (Alfrey, Jr. et al.), "Highly Reflective Thermoplastic Optical Bodies For Infrared, Visible or Ultraviolet Light"; U.S. Pat. No. 4,446,305 (Rogers et al.); U.S. Pat. No. 4,540,623 (Im et al.); U.S. Pat. No. 5,448,404 (Schrenk et al.); U.S. Pat. No. 5,882,774 (Jonza et al.) "Optical Film"; U.S. Pat. No. 6,045,894 (Jonza et al.) "Clear to Colored Security Film"; U.S. Pat. No. 6,531,230 (Weber et al.) "Color Shifting Film"; PCT Publication WO 99/39224 (Ouderkirk et al.) "Infrared Interference Filter"; and U.S. Patent Publication 2001/0022982 A1 (Neavin et al.), "Apparatus For Making Multilayer Optical Films", all of which are incorporated herein by reference. In such polymeric multilayer optical films, polymer materials are used predominantly or exclusively in the makeup of the individual layers. Such films can be compatible with high volume manufacturing processes, and may be made in large sheets and roll goods.

The multilayer film can be formed by any useful combination of alternating polymer type layers, in many embodiments, at least one of the alternating polymer layers is birefringent and oriented. In some embodiments, one of the alternating polymer layer is birefringent and orientated and the other alternating polymer layer is isotropic. In one embodiment, the multilayer optical film is formed by alternating layers of a first polymer type including polyethylene terephthalate (PET) or copolymer of polyethylene terephthalate (coPET) and a second polymer type including poly(methyl methacrylate) (PMMA) or a copolymer of poly(methyl methacrylate) (coPMMA). In another embodiment, the multilayer optical film is formed by alternating layers of a first polymer type including polyethylene terephthalate and a second polymer type including a copolymer of poly(methyl methacrylate and ethyl acrylate). In another embodiment, the multilayer optical film is formed by alternating layers of a first polymer type including a glycolated polyethylene terephthalate (PETG—a copolymer ethylene terephthalate and a second glycol moiety such as, for example, cyclohexanedimethanol) or a copolymer of a glycolated polyethylene terephthalate (coPETG) and second polymer type including polyethylene naphthalate (PEN) or a copolymer of polyethylene naphthalate (coPEN). In another embodiment, the multilayer optical film is formed by alternating layers of a first polymer type including polyethylene naphthalate or a copolymer of polyethylene naphthalate and a second polymer type including poly(methyl methacrylate) or a copolymer of poly (methyl methacrylate). Useful combination of alternating polymer type layers are disclosed in U.S. Pat. No. 6,352,761 and U.S. Pat. No. 6,797,396, which are incorporated by reference herein.

Figure 2:
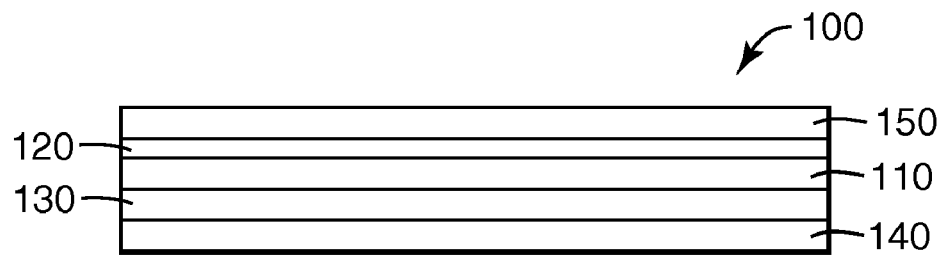
FIG. 2 schematically illustrates an embodiment of a solar control multilayer film article.

FIG. 2 schematically illustrates an embodiment of a solar control multilayer film article 100. The film 100 includes an infrared light reflecting multilayer film 110 having alternating layers of a first polymer type and a second polymer type, as described above. An infrared light absorbing hardcoat layer 120 (also referred to herein simply as the "hardcoat layer") is disposed adjacent the multilayer film 110. An adhesive layer 130 is disposed on the multilayer film 110. A release layer or substrate 140 is disposed on the adhesive layer 130. An optional second hardcoat layer 150 can be disposed adjacent the multilayer film 110.

In many embodiments, the film 100 includes an infrared light reflecting multilayer film 110 having alternating layers of a first polymer type and a second polymer type, as described above and the hardcoat layer 120 is disposed adjacent the multilayer film 110. In some embodiments, the hardcoat layer 120 includes a metal oxide dispersed within a cured polymeric binder. In some embodiments, this hardcoat layer 120 has a thickness in a range from 1 to 20 micrometers, or from 1 to 10 micrometers, or from 1 to 5 micrometers. An adhesive layer 130 is disposed on the multilayer film 110. A release layer or optical substrate 140 is disposed on the adhesive layer 130.

Figure 3:
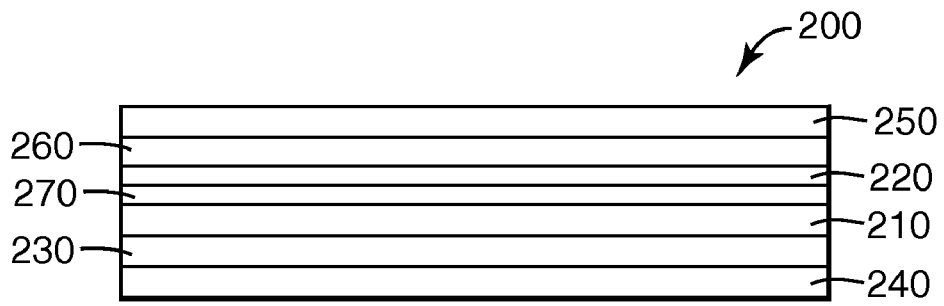
FIG. 3 schematically illustrates another embodiment of a solar control multilayer film article.

FIG. 3 schematically illustrates another embodiment of a solar control multilayer film article 200. The film 200 includes an infrared light reflecting multilayer film 210 having alternating layers of a first polymer type and a second polymer type, as described above. A infrared light absorbing hardcoat layer 220 is disposed adjacent the multilayer film 210. An optional intermediate adhesive layer 270 is disposed between the hardcoat layer 220 and the multilayer film 210. An adhesive layer 230 is disposed on the multilayer film 210. A release layer or optical substrate 240 can be disposed on the pressure sensitive adhesive layer 230. An optional second hardcoat layer 250 can be disposed adjacent the multilayer film 210. An optional intermediate polymeric layer 260 is disposed between the optional second hardcoat layer 250 and the intermediate adhesive layer 270.

The above multilayer film article constructions provide improved solar control film articles, in some embodiments, the multilayer film article has an average visible light transmission (400 to 780 nm) of at least 45% and an average infrared light transmission for 780 nm to 2500 nm light of less than 10% or less than 15%. In some embodiments, the multilayer film article has an average visible light transmission of at least 60% and an infrared light transmission of 20% or less for substantially all wavelengths between 950 nm and 2500 nm. In some embodiments, the multilayer film article has an average light reflection between 780 and 1200 nm of 50% or greater and an average light transmission between 1400 and 2500 nm of 50% or less. In further embodiments, the multilayer film article has an average light reflection between 780 and 1200 nm of 80% or greater and an average light transmission between 1400 and 2500 nm of 20% or less, in still further embodiments, the multilayer film article has an average light reflection between 780 and 1200 nm of 90% or greater and an average light transmission between 1400 and 2500 nm of 5% or less.

In one embodiment, the hardcoat layer has a static contact angle of water that is greater than 70 degrees. In yet another embodiment, the hardcoat layer has a static contact angle of water that is greater than 90 degrees. In a further embodiment, the hardcoat layer has a static contact angle of water that is greater than 100 degrees. In one embodiment of the invention, the hardcoat layer has a static contact angle of hexadecane (oil) that is greater than 50 degrees.

In one embodiment, a combination of low surface energy (e.g. anti-soiling, stain resistant, oil and/or water repellency) and durability (e.g. abrasion resistance) are desirable properties for the hardcoat layer. The hardcoat layer can also function, in some embodiments, to decrease glare loss while improving durability and optical clarity.

The surface energy can be characterized by various methods such as contact angle and ink repellency, as determined by the test methods described in the Examples. In this application, "stain repellent" refers to a surface treatment, exhibiting a static contact angle with water of at least 70 degrees. In one embodiment, the contact angle is at least 80 degrees and in another embodiment, at least 90 degrees. Alternatively, or in addition thereto, the static contact angle with hexadecane is at least 40 degrees, in another embodiment at least 50 degrees, and in yet another embodiment at least 60 degrees. Low surface energy results in anti-soiling and stain repellent properties as well as rendering the exposed surface easy to clean. Another indicator of low surface energy relates to the extent, to which ink from a pen or marker beads up when applied to the exposed surface. The surface layer and articles exhibit "ink repellency" when ink from pens and markers beads up into discrete droplets and can be easily removed by wiping the exposed surface with tissues or paper towels, such as tissues available from the Kimberly Clark Corporation, Roswell, Ga. under the trade designation "SURPASS FACIAL TISSUE."

Durability can be defined in terms of results from the combination of solvent resistance tests and abrasion resistance tests with Steel Wool obtained from Rhodes-American, a division of Homax Products, Bellingham, Wash. under the trade designation "#0000-Super-Fine", with 500 grams weight applied to the stylus and scratched for 300 times, as described in Examples.

The adhesive layer 130 described above can include any type of adhesive that, enables the solar control multilayer film to be affixed to the substrate. In order to attach the solar control film to the glass, one surface of the solar control film is coated with the adhesive and a release sheet is removed from the adhesive layer before application of the film to the substrate. Ultra-violet absorption additives can be incorporated into the adhesive layer.

In one embodiment, the adhesive included in the adhesive layer 130 is a pressure sensitive adhesive (PSA). In another embodiment, the adhesive is a moisture curable adhesive. In embodiments utilizing a PSA, the PSA is an optically clear PSA film such as a polyacrylate pressure sensitive adhesive. The Pressure-Sensitive Tape Council, has defined pressure sensitive adhesives as material with the following properties: (1) aggressive and permanent tack, (2) adherence with no more than finger pressure, (3) sufficient ability to hold onto an adherent, (4) sufficient cohesive strength, and (5) requires no activation by an energy source. PSAs are normally tacky at assembly temperatures, which is typically room temperature or greater (i.e., about 20° C. to about 30° C. or greater). Materials that have been found to function well as PSAs are polymers designed and formulated to exhibit the requisite viscoelastic properties resulting in a desired balance of tack, peel adhesion, and shear holding power at the assembly temperature. The most commonly used polymers for preparing PSAs are natural rubber-, synthetic rubber- (e.g., styrene/butadiene copolymers (SBR) and styrene/isoprene/styrene (SIS) block copolymers), silicone elastomer-, poly alpha-olefin-, and various (meth)acrylate- (e.g., acrylate and methacrylate) based polymers. Of these, (meth)acrylate-based polymer PSAs have evolved as one class of PSA for the present invention due to their optical clarity, permanence of properties over time (aging stability), and versatility of adhesion levels, to name just a few of their benefits.

The release liner described above can be formed of any useful material such as, for example, polymers or paper and may include a release coat. Suitable materials for use in release coats include, but are not limited to, fluoropolymers, acrylics and silicones designed to facilitate the release of the release liner from the adhesive.

The substrate described above can be formed of any useful material and in many embodiments is an optical substrate, in some embodiments, the substrate is formed of a polymeric material such as, for example, cellulose triacetate, polycarbonate, polyacrylate, polypropylene, or polyethylene terephthalate. In other embodiments, the substrate is formed of an inorganic material such as, for example, quartz, glass, sapphire, YAG, or mica. The substrate can have any useful thickness. In one embodiment, the substrate is automotive or architectural glass, in some embodiments including clear glass substrates as a glazing system, the glazing system has a shading coefficient of 0.68 or less, or 0.6 or less, or 0.55 or less, or 0.50 or less, at a $T_{VIS}$ of 70% or greater.

The hardcoat layer can improve the durability of the substrate during processing and during use of the end product. The hardcoat layer can include any useful material, such as silica-based hardcoats, siloxane hardcoats, melamine hardcoats, acrylic hardcoats, and the like. The hardcoat layer can be any useful thickness such as, for example, from 1 to 20 micrometers, or 1 to 10 micrometers, or 1 to 5 micrometers.

The hardcoat layer comprises the reaction product of a mixture comprising at least one organic polyethylenically unsaturated compound; at least one fluoroalkyl pendent siloxane compound; infrared light absorbing nanoparticles; and at least one polymerization initiator. The mixture can be referred to herein as the "hardcoat composition".

The hardcoat composition comprises at least one organic polyethylenically unsaturated component having two or more ethylenically unsaturated, polymerizable groups. The polyethylenically unsaturated component is of the formula $R^4(Z')_j$, wherein $R^4$ is a organic moiety of valency j, j is at least 2, and Z' is an ethylenically unsaturated polymerizable group, reactive with said ethylenically or multiethylenically unsaturated group of said fluoroalkyl pendent siloxane. In one embodiment, the $R^4$ moiety is a hydrocarbyl group (containing just carbon and hydrogen), and in another embodiment, the $R^4$ moiety is a linear, branched, cyclic or acyclic non-urethane aliphatic group.

The ethylenically unsaturated group Z' may include alkenyl groups, such as vinyl, allyl, and butentyl; alkynyl groups such as ethynyl, propynyl and butynyl, vinyloxyalkylene (e.g. $CH_2=CHO-C_rH_{2r}-$), allyloxyalkylene, (e.g. $CH_2=CHCH_2O-C_rH_{2r}-$) and (meth)acryloyl groups, (e.g. $CH_2=CR''CO_2-C_rH_{2r}-$, $R''=C_1-C_4$ alkyl F, and nitrogen analogues thereof) where r is an integer of 1 to 12. In one embodiment the Z' group of the polyethylenically unsaturated compound is a (meth)acryloyl group.

A wide variety of (meth)acryloyl compounds can be used in the coating compositions, such as, for example, di(meth)acryloyl containing compounds such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified, neopentylglycol hydroxypivalate diacrylate, cyclohexanedimethanol diacrylate, diethylene glycol diacrylate, dipropylene glycol diacrylate, ethoxylated (10) bisphenol A diacrylate, ethoxylated (3) bisphenol A diacrylate, ethoxylated (30) bisphenol A diacrylate, ethoxylated (4) bisphenol A diacrylate, hydroxypivalaldehyde modified trimethylolpropane diacrylate, neopentyl glycol diacrylate, polyethylene glycol (200) diacrylate, polyethylene glycol (400) diacrylate, polyethylene glycol (600) diacrylate, propoxylated neopentyl glycol diacrylate, tetraethylene glycol diacrylate, tricyclodecanedimethanol diacrylate, triethylene glycol diacrylate, tripropylene glycol diacrylate; tri(meth)acryl containing compounds such as glycerol triacrylate, trimethylolpropane triacrylate, ethoxylated triacrylates (e.g., ethoxylated (3) trimethylolpropane triacrylate, ethoxylated (6) trimethylolpropane triacrylate, ethoxylated (9) trimethylolpropane triacrylate, ethoxylated (20) trimethylolpropane triacrylate), pentaerythritol triacrylate, propoxylated triacrylates (e.g., propoxylated (3) glyceryl triacrylate, propoxylated (5.5) glyceryl triacrylate, propoxylated (3) trimethylolpropane triacrylate, propoxylated (6) trimethylolpropane triacrylate), trimethylolpropane triacrylate; higher functionality (meth)acryl containing compounds such as ditrimethylolpropane tetraacrylate, dipentaerythritol pentaacrylate, ethoxylated (4) pentaerythritol tetraacrylate, pentaerythritol tetraacrylate, caprolactone modified dipentaerythritol hexaacrylate; oligomeric (meth)acryl compounds such as, for example, polyester acrylates, epoxy acrylates; polyacrylamide analogues of the foregoing; and combinations thereof.

Such compounds are widely available from vendors such as, for example, Sartomer Company, Exton, Pa.; UCB Chemicals Corporation, Smyrna, Ga.; and Aldrich Chemical Company, Milwaukee, Wis. Additional useful (meth)acrylate materials include hydantoin moiety-containing poly(meth)acrylates, for example, as described in U.S. Pat. No. 4,262,072 (Wendling et al.).

Exemplary commercially available (meth)acryloyl compounds include those available from Sartomer Company, Exton, Pa. such as tripropyleneglycol diacrylate available under the trade designation "SR306", trimethylolpropane triacrylate available under the trade designation "SR351", pentaerythritol triacrylate available under the trade designation "SR444", dipentaerythritol pentaacrylate available under the trade designation "SR399LV", ethoxylated (3) trimethylolpropane triacrylate available under the trade designation "SR454", and ethoxylated (4) pentaerythritol triacrylate, available under the trade designation "SR494", and combinations thereof.

Although as little as 5 parts by weight of at least one organic polyethylenically unsaturated component, (relative to 100 parts by weight of the at least one organic polyethylenically unsaturated compound and the at least one fluoroalkyl pendent siloxane) may result in suitable durability for some applications, the concentration is generally maximized, particularly since these compounds are generally less expensive than fluorinated compounds. Accordingly, the coating compositions described herein typically comprise at greater than 50 parts by weight non-fluorinated organic polyethylenically unsaturated compound. In some implementations the total amount of non-fluorinated organic polyethylenically unsaturated compound may comprise greater than 60 parts by weight, at least 70 parts by weight, at least 80 parts by weight, at least 90 parts by weight and even about 99.5 parts by weight of the hardcoat composition to make up the hardcoat layer.

Alternatively, the polyethylenically unsaturated component may comprise surface functionalized inorganic particles, in one embodiment nanoparticles (having an average particle size of less than 100 nanometers) having a plurality of polyethylenically unsaturated groups. These particles and nanoparticles can be prepared from colloidal materials from the group of silica, zinc oxide, titania, alumina, zirconia, vanadia, chromia, iron oxide, antimony oxide, tin oxide, other colloidal metal oxides, and mixtures thereof, functionalized such that (a) the particles disperse in the curable composition and (b) the ethylenically unsaturated groups attached to the particle are capable of polymerization; these particles can comprise essentially a single oxide such as silica or can comprise a core of an oxide of one type (or a core of a material) on which is deposited the oxide of another type. The particles can have an average particle diameter of 5 to about 1000 nm, in one embodiment less than 100 nanometers, in another embodiment 10 to 50 nm. Average particle size can be measured using transmission electron microscopy to count the number of particles of a given diameter. Additional examples of suitable colloidal silicas are described in U.S. Pat. No. 5,126,394, incorporated herein by reference.

Such particles are described in U.S. Pat. Nos. 6,353,037, and 6,462,100 (Thunhorst et al.), and U.S. Pat. No. 6,329,058 (Arney et al.) and are incorporated herein by reference. Other useful surface modified particles are described in published application US 2002/0128336 (Baran et al.) incorporated herein by reference.

In one embodiment the particles are (meth)acryloyl functionalized inorganic particles, i.e. functionalized with a plurality of (meth)acryloyl groups. Typically the silica particles are functionalized by adding a silylacrylate to aqueous colloidal silica. Examples of acrylate functionalized colloidal silica are described in U.S. Pat. Nos. 4,491,508 and 4,455,205 to Olsen et al.; U.S. Pat. Nos. 4,478,876 and 4,486,504 to Chung; and U.S. Pat. No. 5,258,225 to Katsamberis, all of which are herein incorporated by reference.

The polyethylenically unsaturated inorganic particles may substitute for all or a part of the organic polyethylenically unsaturated compound, i.e. the hardcoat composition may comprise a fluoroalkyl pendent siloxane, a polyethylenically unsaturated functionalized particle component, infrared absorbing nanoparticles, and a polymerization initiator. Generally, the total amount of ethylenically unsaturated component, whether an organic-compound, or a surface functionalized inorganic particle component, or a combination thereof, is greater than 50 parts by weight, i.e. 51 to 99.95 parts by weight.

The hardcoat composition, the reaction product of which is the hardcoat layer, also includes at least one fluoroalkyl pendent siloxane compound.

In one embodiment, a pendent fluoroalkyl siloxane compound can be represented by the following formula:

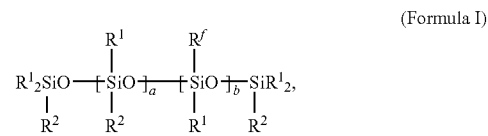
(Formula I)

wherein $R^1$ is a monovalent hydrocarbyl organic group;

$R^2$ is $R^1$ or an ethylenically or multi-ethylenically unsaturated group, Z:

$R^f$ is a fluoroalkyl group or a perfluoropolyether group;

a is 0 to 2000;

b is 1 to 2000, with the proviso that a+b is at least 5, and wherein at least two of said groups are an ethylenically unsaturated group Z.

With respect to Formula I, the fluoroalkyl silicone may comprise compounds having at least two terminal ethylenically unsaturated groups, represented by formula II;

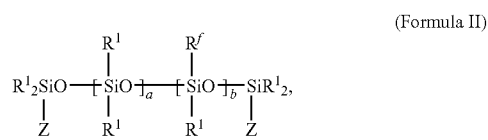
(Formula II)

wherein $R^1$, Z, $R^f$, a, and b are as defined above.

The fluoroalkyl pendent siloxane compound may also be represented by formula III

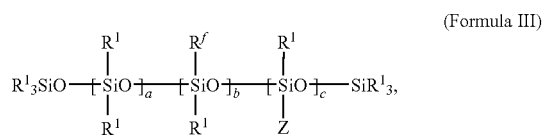
(Formula III)

wherein $R^1$, Z, $R^f$, a, and b are as defined above; and c is 2 to 2000, with the proviso that a+b+c is at least 5.

The fluoroalkyl pendent siloxane compound may also be represented by formula IV

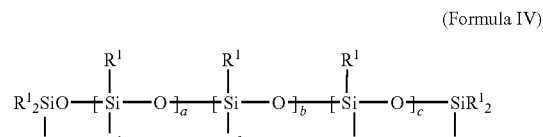
(Formula IV)

wherein $R^1$, Z, $R^f$, a, b, and c are as defined above.

The fluoroalkyl pendent siloxane compound may also be represented by formula V

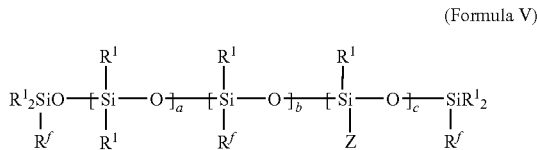

(Formula V)

wherein $R^1$, Z, $R^f$, a, b, and c are as defined above.

In another embodiment, a pendent fluoroalkyl siloxane compound can be represented by formula VI:

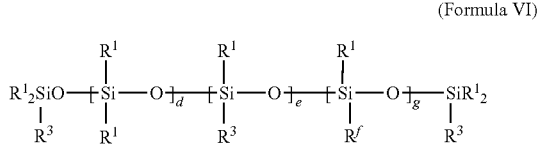

(Formula VI)

wherein $R^1$, and $R^f$ are as defined above; and
$R^3$ is H or $R^1$;
d is 0 to 2000;
e is 0 to 2000; and
g is 1 to 2000, with the proviso that d+e+g is at least 5, and at least two $R^3$ are H.

The invention also includes articles with a hardcoat layer formed from a hardcoat composition where the at least one fluoroalkyl pendent siloxane compound is:

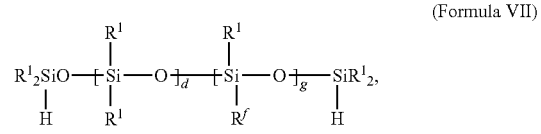

(Formula VII)

wherein $R^1$, $R^f$, d, and g are as defined above, with the proviso that d+g is at least 5.

The fluoroalkyl pendent siloxane compound can also be represented by Formula VII:

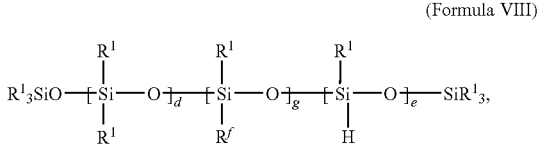

(Formula VIII)

wherein $R^1$, $R^f$, d, e, and g are as defined above, with the proviso that d+e+g is at least 5.

The fluoroalkyl pendent siloxane compound can also be represented by Formula VIII:

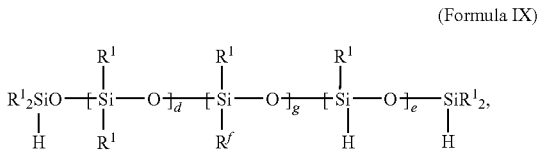

(Formula IX)

wherein $R^1$, $R^f$ d, e, and g are as defined above.

The fluoroalkyl pendent siloxane compound can also be represented by Formula IX:

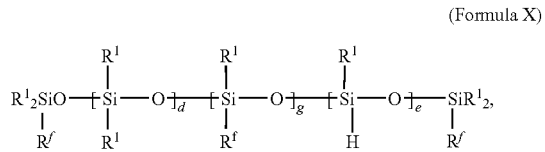

(Formula X)

wherein $R^1$, $R^f$, d, e, and g are as defined above.

The at least one fluoroalkyl pendent siloxane compounds may also include more than one compound. In one embodiment, two or more compounds can be reacted together with or without a catalyst before they are added to the mixture that ultimately results in the hardcoat layer, once cured. In another embodiment, two or more compounds can be combined in the mixture that ultimately results in the hardcoat layer and they react within the mixture either before or at the time the hardcoat layer is cured.

Embodiments can also includes one or more compounds of the formulae presented herein reacted with a hydrosilylation catalyst. In one embodiment, one or more compounds according to any one Formulae VI to X can be combined with a hydrosilylation catalyst. Accordingly, at least one hydrosilylation catalyst (including photo-hydrosilylation catalysts) can be included in hardcoat compositions. Useful hydrosilylation catalysts include thermal catalysts (e.g., platinum catalysts), which are effective for catalyzing the hydrosilylation reaction between silicon-bonded hydrogen groups and silicon-bonded ethylenically unsaturated groups. Further details concerning thermal hydrosilylation catalysts may be found, for example, in U.S. Pat. No. 2,823,218 (Speier et al.); U.S. Pat. No. 2,970,150 (Bailey); U.S. Pat. Nos. 3,159,601 and 3,159,662 (Ashby); U.S. Pat. No. 3,220,972 (Lamoreaux); U.S. Pat. No. 3,516,946 (Modic); U.S. Pat. No. 3,814,730 (Karstedt); U.S. Pat. No. 4,029,629 (Jeram); U.S. Pat. Nos. 4,533,575 and 4,504,645 (Melancon); and U.S. Pat. No. 5,741,552 (Takayama, et al.); the disclosures of which are incorporated herein by reference.

In one embodiment, the at least one fluoroalkyl pendent siloxane compound includes:

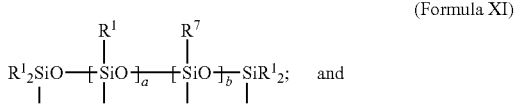

(Formula XI)

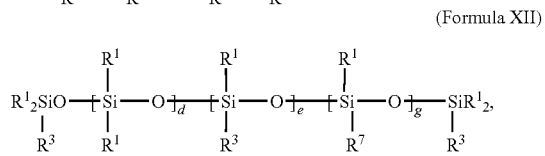

(Formula XII)

wherein $R^1$, $R^2$, $R^3$, a, b, d, e, and g are as defined above; and
$R^7$ is $R^1$ or $R^f$, wherein $R^1$ and $R^f$ are as defined above, with the proviso that at least one $R^7$ is $R^f$, at least two $R^2$ are Z, and at least two $R^3$ are H.

The fluoroalkyl or perfluoropolyether group, $R^f$, may be $C_nF_{2n+1}(CH_2O)_oC_mH_{2m}-$, $C_nF_{2n+1}CHXCF_2(C_mH_{2m}O)_oC_pH_{2p}-$ or $C_nF_{2n+1}OCHXCF_2(C_mH_{2m}O)_oC_pH_{2p}-$; wherein X is H or F; n is an integer of 1 to 12; m is an integer of 1 to 12; o is 0 or 1; and p is an integer of 2 to 12. In one embodiment, n is an integer of 3 to 6. $R^f$ may also refer to HFPO. The size of the fluoroalkyl or perfluoropolyether group, and the number of $R^f$ groups, is chosen such that the cured coating has at least 10 wt % fluorine, in another embodiment at least 20 wt % fluorine.

Representative examples of fluoroalkyl groups are $CF_3CH_2CH_2$—, $CF_3CF_2CF_2CF_2CH_2CH_2$—, $(CF_3)_2NCF_2CF_2CH_2CH_2$—, $CF_3CH_2OCH_2CH_2$—, $CF_3CF_2CH_2OCH_2CH_2$—, $CF_3CFHCF_2CH_2OCH_2CH_2$—, $CF_3CFHCF_2OCH_2CH_2$—, $CF_3CF_2CF_2CF_2CH_2CF_2CH_2CH_2$—, HFPO, and $CF_3OCF_2CF_2CH_2CH_2$—. In another embodiment, $R^f$ is HFPO.

The monovalent organic groups represented by $R^1$ may be aliphatic or aromatic and may have 1 to 20 carbon atoms. In another embodiment, $R^1$ may have from 1 to 10 carbon atoms. Examples of monovalent organic groups include, but are not limited to, monovalent hydrocarbon groups. Monovalent hydrocarbon groups include, but are not limited to, alkyl such as methyl, ethyl, propyl, pentyl, octyl, undecyl, and octadecyl; cycloalkyl such as cyclohexyl, and aromatic groups (aryl) such as phenyl, tolyl, and napthyl.

The ethylenically or multi-ethylenically unsaturated group Z may include alkenyl groups, such as vinyl, allyl, and butentyl; alkynyl groups such as ethynyl, propynyl and butynyl, vinyloxyalkylene (e.g. $CH_2$=CHO—$C_qH_{2q}$—), allyloxyalkylene (e.g. $CH_2$=CHCH$_2$O—$C_qH_{2q}$—), and (meth)acryloyl groups, where q is an integer of 1 to 12. In one embodiment, the Z group includes a vinyl group.

With respect to Formulas I-XII, it will be understood by one of skill in the art, that the illustrated fluoroalkyl pendent siloxanes may be random or block copolymers. The number of silicone units, represented by integers a, b, c, d, e, and g is generally at least five (5) in total in any one compound, regardless of which particular sum the formula represents; e.g., a+b; or a+b+c. In some embodiments, the number of silicone units is generally at least 10, in total; in further embodiments at least 20 in total. Any of the fluoroalkyl silicones may further comprise optional $R^1{}_3SiO_{1/2}$ units, $SiO_{4/2}$ units, $R^1SiO_{3/2}$ units and $R^1{}_2SiO_{2/2}$ units or a combination thereof.

It has been reported that certain perfluorooctyl-containing compounds ($C_8F_{17}$—) may tend to bio-accumulate in living organisms; this tendency has been cited as a potential concern regarding some fluorochemical compositions. For example, see U.S. Pat. No. 5,688,884 (Baker et al.). As a result, there is a desire for fluorine-containing compositions effective in providing desired functional properties, e.g., water- and oil-repellency, surfactant properties, etc. while eliminating more effectively from biological systems.

The fluoroalkyl pendent siloxane compounds utilized herein may also provide additional advantages. First, the hardcoat layers containing the shorter (i.e. $C_3$ to $C_6$) fluoroalkyl groups may be produced at a lower cost per weight because of higher yields while maintaining their potency as effective low surface energy coatings at the same weight basis. For example, the heptafluorobutyryl fluoride precursor may be prepared in yields of 60% as compared to perfluorooctanoyl fluoride precursor (31%) in an electrochemical fluorination process (*Preparation, Properties, and Industrial Applications of Organofluorine Compounds*, edited by R. E. Banks, Ellis Horwood Ltd (1982), p 26). Furthermore, the short chain carboxylic acids (the presumed intermediate degradation products) are less toxic and less bioaccumulative than the longer chain homologues.

Exemplary fluoroalkyl pendent siloxanes include, but are not limited to $(CH_2$=CH$)Si(Me)_2O$—$[Si(Me)(C_2H_4CF_3)$—O]$_b$—$Si(Me)_2(CH$=CH$_2)$, $(CH_2$=CH$_2)Si(Me)_2O$—[Si(Me)$_2$-O]$_a$—[Si(Me)(C$_2$H$_4$C$_4$F$_9$)—O]$_b$—Si(Me)$_2$(CH=CH)$_2$, (CH$_2$=CH)Si(Me)$_2$O—[Si(Me)$_2$-O]$_a$—[Si(Me)(C$_2$H$_4$CF$_3$)—O]$_b$—Si(Me)$_2$(CH=CH$_2$), (CH$_2$=CH)Si(Me)$_2$O—[Si(Me)(C$_2$H$_4$C$_4$F$_9$)—O]$_b$—Si(Me)$_2$(CH=CH$_2$), or combinations thereof wherein a, and b are as defined above. Other exemplary fluoroalkyl pendent siloxane compounds include, but are not limited to (CH$_2$=CH)Si(Me)$_2$O—[Si(Me)$_2$-O]$_a$—[Si(Me)(C$_2$H$_4$C$_4$F$_9$)O]$_b$—[Si(Me)(CH=CH$_2$)—O]$_c$—Si(Me)$_2$(CH=CH$_2$), (CH$_2$=CH)Si(Me)$_2$O—[Si(Me)$_2$-O]$_a$—[Si(Me)(C$_2$H$_4$CF$_3$)—O]$_b$—[Si(Me)(CH=CH$_2$)—O]$_c$—Si(Me)$_2$(CH=CH$_2$), (Me)$_3$SiO—[Si(Me)$_2$-O]$_a$—[Si(Me)(C$_2$H$_4$CF$_3$)—O]$_b$—[Si(Me)(CH=CH$_2$)—O]$_c$—Si(Me)$_3$, (Me)$_3$SiO—[Si(Me)$_2$O]$_a$—[Si(Me)(C$_2$H$_4$C$_4$F$_9$)—O]$_b$—[Si(Me)(CH=CH$_2$)—O]$_c$—Si(Me)$_3$, (Me)$_3$SiO—[Si(Me)(C$_2$H$_4$C$_4$F$_9$)—O]$_b$—[Si(Me)(CH=CH$_2$)—O]$_c$—Si(Me)$_3$, (Me)$_3$SiO—[Si(Me)(C$_2$F$_4$CF$_3$)—O]$_b$—[Si(Me)(CH=CH$_2$)—O]$_c$—Si(Me)$_3$, (Me)$_3$SiO—[Si(Me)(C$_2$H$_4$C$_4$F$_9$)—O]$_b$—[Si(Me)(C$_2$H$_4$CO$_2$C((Et)(CH$_2$OC(O)CH=CH$_2$)$_2$))—O]$_c$—Si(Me)$_3$, (Me)$_3$SiO—[Si(Me)(C$_3$H$_6$NHC(O)HFPO)—O]$_b$—[Si(Me)(C$_2$H$_4$CO$_2$C((Et)(CH$_2$OC(O)CH=CH$_2$)$_2$))—O]$_c$—Si(Me)$_3$, (Me)$_3$SiO—[Si(Me)(CH$_2$CH$_2$C(O)OC$_2$H$_4$OC(O)HFPO)—O]$_b$—[Si(Me)(C$_2$H$_4$CO$_2$C((Et)(CH$_2$OC(O)CH=CH$_2$)$_2$))—O]$_c$—Si(Me)$_3$, (Me)$_3$SiO—[Si(Me)(CH$_2$CHMeC(O)OC$_2$H$_4$OC(O)HFPO)—O]$_b$—[Si(Me)(C$_2$H$_4$CO$_2$C((Et)(CH2OC(O)CH=CH$_2$)$_2$))—O]$_c$—Si(Me)$_3$, (C$_4$F$_9$CH$_2$CH$_2$)Si(Me)$_2$O—[Si(Me)(C$_2$H$_4$C$_4$F$_9$)—O]$_b$—[Si(Me)(CH=CH$_2$)—O]$_c$—Si(Me)$_2$(CH$_2$CH$_2$C$_4$F$_9$), or combinations thereof, wherein a, b, and c are as defined above. Exemplary fluoroalkyl pendent siloxane compounds include, but are not limited to (Me)$_2$SiH—O—[Si(Me)(H)—O]$_e$—[Si(Me)(C$_2$H$_4$CF$_3$)—O]$_g$—SiH(Me)$_2$, (Me)$_2$SiH—O—[Si(Me)(H)—O]$_e$—[Si(Me)(C$_2$H$_4$C$_4$F$_9$)—O]$_g$SiH(Me)$_2$, (Et)$_2$SiH—O—[Si(Et)(H)—O]$_e$—[Si(Me)(C$_2$H$_4$CF$_3$)—O]$_g$—SiH(Et)$_2$, (Et)$_2$SiH—O—[Si(Et)(H)—O]$_e$—[Si(Me)(C$_2$H$_4$C$_4$F$_9$)—O]$_g$—SiH(Et)$_2$, (Me)$_2$SiH—O—[Si(Me)(H)—O]$_e$—[Si(Me)(C$_2$H$_4$CF$_3$)—O]$_g$—[Si(Me)$_2$-O]$_d$—SiH(Me)$_2$, (Me)$_2$SiH—O—[Si(Me)(H)—O]$_e$—[Si(Me)(C$_2$H$_4$C$_4$F$_9$)—O]$_g$—[Si(Me)$_2$-O]$_d$—SiH(Me)$_2$, (Me)$_2$SiH—O[Si(Me)(H)—O]$_e$—[Si(Me)(C$_2$H$_4$CF$_3$)—O]$_g$—[Si(Me)(Ph)-O]$_d$—SiH(Me)$_2$, (Me)$_2$SiH—O—[Si(Me)(H)—O]$_e$—[Si(Me)(C$_2$H$_4$C$_4$F$_9$)—O]$_g$—[Si(Me)(Ph)-O]$_d$—SiH(Me)$_2$, (Me)$_3$Si—O—[Si(Me)(H)—O]$_e$—[Si(Me)(C$_2$H$_4$CF$_3$)—O]$_g$—Si(Me)$_3$, (Me)$_3$Si—O—[Si(Me)(H)—O]$_e$—[Si(Me)(C$_2$H$_4$C$_4$F$_9$)—O]$_e$—[Si(Me)(C$_2$H$_4$CF$_3$)—O]$_g$—Si(Me)$_3$, (Me)$_3$Si—O—[Si(Me)(H)—O]$_e$—[Si(Me)(C$_2$H$_4$CF$_3$)—O]$_g$—[Si(Me)$_2$-O]$_d$—Si(Me)$_3$, (Me)$_3$Si—O—[Si(Me)(H)—O]$_e$—[Si(Me)(C$_2$H$_4$C$_4$F$_9$)—O]$_g$—[Si(Me)$_2$-O]$_d$—Si(Me)$_3$, (Me)$_3$Si—O—[Si(Me)(H)—O]$_e$—[Si(Me)(C$_2$H$_4$CF$_3$)—O]$_g$—[Si(Me)(Ph)-O]$_d$—Si(Me)$_3$, (Me)$_3$Si—O—[Si(Me)(H)—O]$_e$—[Si(Me)(C$_2$H$_4$C$_4$F$_9$)—O]$_g$—[Si(Me)(Ph)-O]$_d$—Si(Me)$_3$, (Me)$_3$Si—O—[Si(Me)(H)—O]$_e$—[Si(Me)(CH$_2$C(H)(Me)C(O)OC$_2$H$_4$OC(O)HFPO)—O]$_g$—[Si(Me)$_2$-O]$_d$—Si(Me)$_3$, (Me)$_3$Si—O—[Si(Me)(H)—O]$_e$—[Si(Me)(C$_3$H$_6$NHC(O)HFPO)—O]$_g$—[Si(Me)$_2$-O]$_d$—Si(Me)$_3$, (C$_4$F$_9$CH$_2$CH$_2$)Si(Me)$_2$-O—[Si(Me)(C$_2$H$_4$C$_4$F$_9$)—O]$_b$—[Si(Me)(H)—O]$_e$—Si(Me)$_2$(CH$_2$CH$_2$C$_4$F$_9$), or combinations thereof, wherein e, d, and g are as defined above.

The fluoroalkyl pendent siloxanes are known to those of skill in the art and may be prepared by several routes. In one exemplary method, a fluoroalkyl vinyl compound can be hydrosilylated with a dichloroalkyl silane, treated with water to form the cyclic trimer (or tetramer), and then polymerized with base (optionally with the cyclic trimer of a dialkyl siloxane) to form the fluoroalkyl silicone, as shown below: $R^fCH$=$CH_2 \rightarrow R^fCH_2CH_2SiMeCl_2 \rightarrow$ cyclic trimer or tetramer of $R^fCH_2CH_2SiMeO_{2/2} \rightarrow$ —(SiMe(C$_2$H$_4$R$^f$)—O)$_n$—, or copolymer with cyclic trimer or tetramer of Me$_2$SiO$_{2/2}$→—(SiMe(C$_2$H$_4$R$^f$)—O)$_n$—(SiMe$_2$-O)$_m$—. The polymerization with a cyclic trimer or tetramer of CH$_2$=CHSiMeO$_{2/2}$→—(SiMe(C$_2$H$_4$R$^f$)—O)$_n$(SiMe(CH=CH$_2$)—O)$_m$.

Another exemplary route is the hydrolysis from R$^f$CH$_2$CH$_2$SiMe(OMe)$_2$ with or without other RSiMe(OMe)$_2$, followed by dehydration to the polymer.

Yet another exemplary route is the direct introduction of pendent fluoroalkyl groups into polysiloxanes, such as that described by John Tsibouklis, et al. in J. Fluorine Chem., 104 (2000), 37-45.

Other methods for preparing fluoroalkyl silicones are described in U.S. Pat. No. 2,915,544 (Holbrook et al.), P. Tarrant et al., J. Am. Chem. Soc., vol. 79, pp. 6536-6540, 1957; A. M. Geyer et al., J. Chem. Soc. pp. 4472-9, 1957; Y. K. Kim et al., J. Org. Chem., vol. 38, pp 1615-6, 1973; and E. Beyou et al., Tet. Letters, vol. 36(11), pp. 1843-4, 1995.

Further, the fluoroalkyl silicone may be produced by the silica hydrosol capping process of Daudt et al. with ethylenically unsaturated group containing endblocking reagents. The method of Daudt et al., is disclosed in U.S. Pat. No. 2,676,182. Briefly stated, the method of Daudt et al. involves reacting a silica hydrosol under acidic conditions with a hydrolyzable triorganosilane such as trimethylchlorosilane, a siloxane such as hexamethyldisiloxane, or mixtures thereof, and recovering a copolymer having units derived therefrom. The resulting copolymers generally contain from 2 to 5 percent by weight of hydroxyl groups.

The fluoroalkyl pendent siloxanes, which typically contain less than 2 percent by weight of silicon-bonded hydroxyl groups, may be prepared by reacting the product of Daudt et al. with an unsaturated organic group-containing endblocking agent and an endblocking agent free of aliphatic unsaturation, in an amount, sufficient to provide from 3 to 30 mole percent of unsaturated organic groups in the final product. Examples of endblocking agents include, but are not limited to, silazanes, siloxanes, and silanes. Suitable endblocking agents are known in the art and exemplified in U.S. Pat. Nos. 4,584,355; 4,591,622; and 4,585,836, incorporated herein by reference. A single endblocking agent or a mixture of such agents may be used to prepare the resin.

Commercially available silicones having a plurality of polyethylenically unsaturated groups include a vinyl-terminated fluorosilicone that is commercially available under the trade designations "SYL-OFF Q2-7785" and "SYL-OFF Q2-7560" from Dow Corning Corp.

The fluoroalkyl pendent siloxanes can be a single fluid or a combination comprising two or more fluoroalkyl silicone fluids that differ in at least one of the following properties: structure, viscosity, average molecular weight, siloxane units, and sequence.

The mixture may optionally further comprise a mono(meth)acryloyl compound having a functional group. Such functional compounds have the general formula:

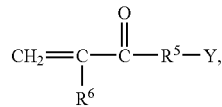

(Formula XIII)

wherein R$^6$ is hydrogen, a C$_1$ to C$_4$ alkyl group, or a phenyl group, preferably hydrogen or a methyl group; R$^5$ is a divalent linking group that joins an (meth)acryloyl group to functional group Y and can contain up to 34, in another embodiment up to 18, in yet another embodiment up to 10, carbon; and optionally, oxygen and nitrogen atoms. R$^5$ can be selected from —O—R$^8$— and —NH—R$^8$—, in which R$^8$ is an alkylene group having 1 to 6 carbon atoms, a 5- or 6-membered cycloalkylene group having 5 to 10 carbon atoms, or an alkylene-oxyalkylene in which each alkylene includes 1 to 6 carbon atoms or is a divalent aromatic group having 6 to 16 carbon atoms; and Y is a functional group for improving the bonding or adhesion of the curable composition to a substrate, in one embodiment Y is selected from the class consisting of hydroxyl, amino (including secondary and tertiary amino), carboxyl, isocyanato, aziridinyl, epoxy, acylhalide, azlactone, oxazolinyl, acetoacetyl, hydrolysable silane (such as trialkoxy silanes) and cyclic anhydride groups. Such compounds are generally used in amounts of 10 parts by weight, based on 100 parts by weight of a mono(meth)acryloyl compound, polyethylenically unsaturated component, and fluoroalkyl silicone component.

In certain embodiments the coated composition comprises the hydrosilylation reaction products of a fluoroalkyl pendent siloxanes having at least two ethylenically unsaturated groups, and a hydrosilicone having at least two Si—H groups. The Si—H groups may be terminal, pendent, or a combination thereof. The fluoroalkyl silicone having a plurality of vinyl groups and the hydrosilicone having a plurality of Si—H groups react by hydrosilylation. Accordingly, at least one hydrosilylation catalyst (including photo-hydrosilylation catalysts) can be included in hardcoat compositions. Useful hydrosilylation catalysts include thermal catalysts (e.g., platinum catalysts), which are effective for catalyzing the hydrosilylation reaction between silicon-bonded hydrogen groups and silicon-bonded ethylenically unsaturated groups. Further details concerning thermal hydrosilylation catalysts may be found, for example, in U.S. Pat. No. 2,823,218 (Speier et al); U.S. Pat. No. 2,970,150 (Bailey); U.S. Pat. Nos. 3,159,601 and 3,159,662 (Ashby); U.S. Pat. No. 3,220,972 (Lamoreaux); U.S. Pat. No. 3,516,946 (Modic); U.S. Pat. No. 3,814,730 (Karstedt); U.S. Pat. No. 4,029,629 (Jeram); U.S. Pat. Nos. 4,533,575 and 4,504,645 (Melancon); and U.S. Pat. No. 5,741,552 (Takayama, et al); the disclosures of which are incorporated herein by reference.

Photoactivated hydrosilylation catalysts (i.e., photohydrosilylation catalysts) may also be used. Examples of hydrosilylation photocatalysts and methods of their use (e.g., photocuring conditions) may be found, for example, in U.S. Pat. Nos. 4,510,094 and 4,530,879 (Drahnak); U.S. Pat. No. 5,145,886 (Oxman et al.); U.S. Pat. No. 6,376,569 (Boardman et al.), and U.S. Pat. No. 6,451,869 (Butts), the disclosures of which are incorporated herein by reference. Combinations of the hydrosilylation catalysts and photocatalysts and/or curing methods may also be used. Photoactivated hydrosilylation, such as PtCpMe$_3$, do not begin the hydrosilylation reaction until exposed to UV light. As a consequence, the curable composition has shelf stability.

The catalyst is typically present in an amount that is effective to catalyze the hydrosilylation reaction. More typically, the catalyst is present in amounts sufficient to provide as little as one part of catalyst, or less, per million parts of the silicone having vinyl groups. On the other hand, amounts of the catalyst sufficient to provide as high as 1 to 10, or more, parts of catalyst per 1,000 parts of the silicone having vinyl groups may also be used.

The reaction product of a fluoroalkyl silicone having at least two ethylenically unsaturated groups, and a hydrosilicone having at least two Si—H groups are combined and cured using a free radical catalyst, in one embodiment, a UV catalyst. The dominant means of crosslinking is between the ethylenically unsaturated groups of the polyethylenically unsaturated component, and the unreacted ethylenically unsaturated groups of the fluoroalkyl silicone.

Alternatively, the fluoroalkyl silicone, the hydrosilicone having at least two Si—H groups, and the polyethylenically unsaturated components may be combined with a hydrosilylation catalyst to effect hydrosilylation, followed by addition of the free radical catalyst, then cured. The hydrosilylation will occur between hydrosilicone and the fluoroalkyl silicone, and between the hydrosilicone and the polyethylenically unsaturated component. However, due to the amount of polyethylenically unsaturated component used, free ethylenically unsaturated groups of the polyethylenically unsaturated compound may remain for subsequent free radical crosslinking.

The hardcoat layer that ultimately forms from, the hardcoat composition also includes infrared light absorbing particles. In one embodiment, the infrared light absorbing particles are chosen to create an article with an acceptable level of haze. Generally, particles in an optical layer begin to have an effect on haze as the particles increase in size. In one embodiment, particles that are a factor of 10× smaller than the relevant wavelengths (i.e. visible light) will not impact the haze of the layer to an unacceptable degree. In one embodiment, an article with haze values below 5% is generally considered acceptable.

In one embodiment, the infrared light absorbing particles include metal oxide particles. Oxide nanoparticles are typically colored and absorb in the different portions of the electromagnetic spectrum, it can be desirable for a solar control article to have high visible light transmission while rejecting as much infrared radiation as possible. Infrared radiation generally refers to electromagnetic radiation between 780 nm and 2500 nm. In one embodiment, the concentration of metal oxide nanoparticles (such as those exemplified below) is generally chosen such that near 100% extinction is achieved at wavelengths higher than 1800 nm; an in another embodiment 100% extinction is achieved at wavelengths higher than 1500 nm. At such concentrations, visible light transmission of at least 50% is desired; and in another embodiment visible light transmission of at least 70% is desired.

Exemplary metal oxide nanoparticles that can be used as infrared absorbing particles in hardcoat compositions of the invention include, but are not limited to tin, antimony, indium and zinc oxides and doped oxides. In some embodiments, the metal oxide nanoparticles include, tin oxide, antimony oxide, indium oxide, indium doped tin oxide, antimony doped indium tin oxide, antinomy tin oxide, antimony doped tin oxide or mixtures thereof. In some embodiments, the metal oxide nanoparticles include tin oxide or doped tin oxide and optionally further includes antimony oxide and/or indium oxide. The nanoparticles can have any useful size such as, for example, 1 to 100, or 30 to 100, or 30 to 75 nanometers. In some embodiments, the metal oxide nanoparticles include antimony tin oxide or doped antimony tin oxide dispersed in a polymeric material. Nanoparticle compositions are commercially available from, for example. Advanced Nano Products Co., LTD., South Korea, under the tradenames TRB-PASTE™ SM6080(B), SH7080, SL6060. In another embodiment, the metal oxide nanoparticles include zinc oxide and/or aluminum oxide, such oxides are available from GfE Metalle und Materialien GmbH, Germany.

In one embodiment, hardcoat compositions of the invention include a sufficient amount of infrared light absorbing particles to provide an article that delivers the desired amount of infrared absorption. In one embodiment, the infrared absorbing particles are present in a range from 20 to 65 wt-%.

In another embodiment, the infrared absorbing particles are present in a range from 20 to 55 wt-%.

To facilitate curing, hardcoat compositions according to the invention also include at least one polymerization initiator. Initiators useful in the invention include both free-radical thermal initiator and/or photoinitiator. Typically, an initiator and/or photoinitiator are present at less than 1.0 wt-%, in one embodiment less than 5 wt-%, and in another embodiment, less than 2 wt-% of the hardcoat composition. Free-radical curing techniques are well known in the art and include, for example, thermal curing methods as well as radiation curing methods such as electron beam or ultraviolet, radiation. Further details concerning free radical thermal and photopolymerization techniques may be found in, for example, U.S. Pat. No. 4,654,233 (Grant et al.); U.S. Pat. No. 4,855,184 (Klun et al); and U.S. Pat. No. 6,224,949 (Wright et al).

Useful free-radical thermal initiators include, for example, azo, peroxide, persulfate, and redox initiators, and combinations thereof.

Useful free-radical photoinitiators include, for example, those known as useful in the UV cure of acrylate polymers. Such initiators include, but are not limited to, benzophenone and its derivatives; benzoin, alpha-methylbenzoin, alpha-phenylbenzoin, alpha-allylbenzoin, alpha-benzylbenzoin; benzoin ethers such as benzil dimethyl ketal (commercially available under the trade designation "IRGACURE 651" from Ciba Specialty Chemicals Corporation of Tarrytown, N.Y.), benzoin methyl ether, benzoin ethyl ether, benzoin n-butyl ether; acetophenone and its derivatives such as 2-hydroxy-2-methyl-1-phenyl-1-propanone (commercially available under the trade designation "DAROCUR 1173" from Ciba Specialty Chemicals Corporation) and 1-hydroxycyclohexyl phenyl ketone (commercially available under the trade designation "IRGACURE 184", also from Ciba Specialty Chemicals Corporation); 2-methyl-1-[4-(methylthio)phenyl]-2-1(4-morpholinyl)-1-propanone commercially available under the trade designation "IRGACURE 907", also from Ciba Specialty Chemicals Corporation); 2-benzyl-2-(dimethylamino)-1-[4-(4-morpholinyl)phenyl]-1-butanone commercially available under the trade designation "IRGACURE 369" from Ciba Specialty Chemicals Corporation); aromatic ketones such as benzophenone and its derivatives and anthraquinone and its derivatives; onium salts such as diazonium salts, iodonium salts, sulfonium salts; titanium complexes such as, for example, that which is commercially available under the trade designation "CGI 784 DC", also from Ciba Specialty Chemicals Corporation); halomethylnitrobenzenes; and mono- and bis-acylphosphines such as those available from Ciba Specialty Chemicals Corporation under the trade designations "IRGACURE 1700", "IRGACURE 1800", "IRGACURE 1850", "IRGACURE 819" "IRGACURE 2005", "IRGACURE 2010", "IRGACURE 2020" and "DAROCUR 4265". Combinations of two or more photoinitiators may also be used. Further, sensitizers such as 2-isopropyl thioxanthone, commercially available from First Chemical Corporation, Pascagoula, Miss., may be used in conjunction with photoinitiator(s) such as "IRGACURE 369".

The hardcoat composition for use as the hardcoat layer may also include other materials as desired, such materials may be chosen to provide better coating and improved performance to meet the requirements for different applications. In one embodiment, one or more hindered amine light stabilizer(s) (HALS) and/or one or more phosphonate stabilizer compound(s) may be added in the polymerizable coating composition, as described in U.S. Pat. No. 6,613,819, the disclosure of which is incorporated herein by reference.

The presence of one or mixed solvents can also be desirable in the hardcoat composition, especially when metal oxide nanoparticles are present. The organic solvent used in the free radical crosslinking reaction can be any organic liquid, that is inert to the reactants and product, and that will not otherwise adversely affect the reaction, but should help to make the formulation stable and the coating in high quality. Suitable organic solvents are polar, including alcohols, such as methanol, ethanol, carbitol and isopropanol, esters, such as ethyl acetate, aromatic solvents such as toluene, ethers such as diethyl ether, THF and t-butyl methyl ether, and ketones, such as acetone and methyl isobutyl ketone. Other solvent systems may also be used, such as acetonitrile, N,N-dimethylformaide and dimethyl sulfone. The amount of solvent can generally be about 20 to 90 percent by weight of the total weight of reactants and solvent.

The hardcoat composition can also include other inorganic particles that can optionally be incorporated in order to decrease static associated with the layer. Generally, metal oxides can be utilized to provide such properties. The metal oxides can also be surface treated with materials such as 3-methacryloxypropyltrimethoxysilane. These particles can provide constructions with antistatic properties and other desirable properties. This can be desirable to prevent static charging and resulting contamination by adhesion of dust and other unwanted debris during handling and cleaning of the film. In one such embodiment, such metal oxide particles are incorporated into the top (thin) layer of two-layer embodiments of this invention, in which the fluoroacrylate containing hardcoat is applied to a hydrocarbon-based hardcoat. At the levels at which such particles may be needed in the coating in order to confer adequate antistatic properties (typically 25 wt % and greater), these deeply colored particles can impart undesired color to the construction. However, in the thin top layer of a two-layer fluorinated hardcoat construction, their effect on the optical and transmission properties of the film can be minimized. Examples of conducting metal oxide nanoparticles useful in this embodiment include antimony double oxide available from Nissan Chemical under the trade designations Celnax CXZ-210IP and CXZ-210IP-F2. When these particles are included at appropriate levels in the coatings of this invention, the resulting fluorinated hardcoats can exhibit static charge decay times less than about 0.5 sec. In this test, the sample is placed between two electrical contacts and charged to +/−5 kV. The sample is then grounded, and the time necessary for the charge to decay to 10% of its initial value is measured and recorded as the static charge decay time. In contrast, film constructions containing no conducting nanoparticles exhibit static charge decay times>30 sec.

As mentioned previously, an article of the invention can optionally include an intermediate adhesive layer 270. The intermediate adhesive layer 270 can be formed of any useful material. In some embodiments, the intermediate adhesive layer 270 can include a pressure sensitive adhesive material, as described above. In some embodiments, the intermediate adhesive layer 270 can include a curable adhesive such as, for example a thermal, UV, or moisture curable adhesive. The intermediate adhesive layer 270 can have any useful thickness such as, for example, 1 to 100 micrometers, or 5 to 50 micrometers, or 10 to 50 micrometers, or 10 to 30 micrometers.

The optional intermediate polymeric layer 260 can be formed of any useful material. In some embodiments, the intermediate polymeric layer 260 can include a polyolefin, polyacrylate, polyester, polycarbonate, fluoropolymer, and the like. In one embodiment, the intermediate polymeric layer 260 can include a polyethylene terephthalate. The intermediate polymeric layer 260 can have any useful thickness such as, for example, 5 to 500 micrometers, or 10 to 100 micrometers, or 25 to 75 micrometers, or 25 to 50 micrometers.

An article of the invention can also include a tear resistant film (not shown). In many embodiments, the tear resistant, film includes alternating layers of stiff polymer and a ductile polymer. In some embodiments, the tear resistant film 160 includes alternating layers of stiff polyester or copolyester and a ductile sebacic acid based copolyester. In many embodiments, the stiff polyester or copolyester layers are oriented in at least one direction and, or are biaxially oriented. Examples of these tear resistant films are described in U.S. Pat. No. 6,040,061; U.S. Pat. No. 5,427,842; and U.S. Pat. No. 5,604,019 which are incorporated by reference herein to the extent they do not conflict with the present disclosure.

In another embodiment, the tear resistant film is a single monolithic polymeric film that provides a desired level of tear resistance. Such films are known in the art as "tough" polymeric film. Toughness can be described as a measure of the energy a polymer can absorb before it breaks, and examples of tough polymers include ABS (poly(acrylonitrile butadiene styrene)), LDPE (linear low density polyethylene), HIPS (high impact polystyrene), polyurethanes and the like. Additionally, increasing the thickness of the monolithic polymeric film may permit the usage of some polymers, such as PET and nylon, to be utilized as a tear resistant film.

By "tear resistant" it is broadly meant that a multilayer film according to this disclosure demonstrates a Graves area in one direction of the film which exceeds the Graves area in the same direction for a single layer film comprising only the stiff polymer of the multilayer film, the single layer film being processed in the same manner as and to substantially the same thickness as the multilayer film. In many embodiments, the tear resistant solar control films demonstrate a Graves area in one direction of the film equal to at least about 40+0.4(x) kpsi % wherein x is the nominal thickness of the film in micrometers. More specifically, Graves area is obtained by mathematically integrating the area beneath the curve in a graphical plot of the stress (as measured in kpsi) experienced by the film versus the strain (as measured by Graves elongation in % which, is defined more fully below) that the film undergoes during a test in which a film sample specifically shaped for the Graves area test is clamped between opposed jaws that are moved apart at a constant rate to concentrate the tearing stresses in a small area. Thus, Graves area is a combined measure of the film's tensile modulus (i.e., the film's stillness and dimensional stability) and the ability of the film to resist advancing a tear. Consequently, Graves area may be regarded as a measure of the total energy required to cause the film to tail; that is, the ability of the film to absorb energy. In many embodiments, the tear resistant solar control films desirably exhibit a Graves elongation at break of at least 20%, or at least 40% during the Graves area test. The tear resistance solar control films may be measured by ASTM Test Method D 1004 (also known as a Graves tear test).

In addition, many multilayer or monolithic tear resistant films according to this disclosure demonstrate a tensile modulus (as measured in a conventional tensile test) of at least 175 kpsi (1,208 MPa), or at least 240 kpsi (1,656 MPa), or at least 450 kpsi (3,105 MPa) in at least one direction of the film.

Both the thickness of the tear resistant multilayer film and the individual layers which comprise the tear resistant multilayer film may vary over wide limits. These films can have a nominal thickness of from about 7 to 500 micrometers, or from about 15 to 185 micrometers. The individual layers of stiff polyester or copolyester can have an average nominal thickness of at least about 0.5 micrometers, or from greater than 0.5 to 75 micrometers, or from about 1 to 25 micrometers. In some embodiments, the ductile sebacic acid based copolyester layers are thinner than the stiff polyester/copolyester layers. The ductile material layers may range in average nominal thickness from greater than about 0.01 micrometer to less than about 5 micrometers, or from about 0.2 to 3 micrometer. Similarly, the exact order of the individual layers is not critical. The total number of layers may also vary substantially, in many embodiments, the tear resistant multilayer film includes at least 3 layers, or from 5 to 35 layers, or from 10 to 15 layers.

The hardcoat composition that ultimately forms the hardcoat layer can also be utilized in a variety of portable and non-portable information display articles. Such hardcoat layers can comprise the reaction product of a composition that comprises at least one polyethylenically unsaturated compound; at least one fluoroalkyl pendent siloxane compound; and at least one polymerization initiator. Such a hardcoat layer can also be referred to as an optical hardcoat layer.

These articles include PDAs, cell phones (including combination PDA/cell phones), LCD televisions (direct lit and edge lit), touch sensitive screens, wrist watches, car navigation systems, global positioning systems, depth finders, calculators, electronic books, CD and DVD players, projection television screens, computer monitors, notebook computer displays, instrument gauges, instrument, panel covers, signage such as graphic displays and the like. The viewing surfaces can have any conventional size and shape and can be planar or non-planar, an example of which is flat panel displays. The coating composition or coated film, can be employed on a variety of other articles as well such as for example camera lenses, eyeglass lenses, binocular lenses, mirrors, retroreflective sheeting, automobile windows, building windows, train windows, boat windows, aircraft windows, vehicle headlamps and taillights, display cases, road pavement markers (e.g. raised) and pavement marking tapes, overhead projectors, stereo cabinet doors, stereo covers, watch covers, as well as optical and magneto-optical recording disks, and the like.

Coatings appropriate for use as optical hardcoat layers are generally substantially free of visual defects. Visual defects that may be observed include but are not limited to pock marks, fisheyes, mottle, lumps or substantial waviness, or other visual indicators known to one of ordinary skill in the art in the optics and coating fields. Thus, a "rough" surface as described in the Experimental section has one or more of these characteristics, and may be indicative of a coating material in which one or more components of the composition are incompatible with each other. Conversely, a substantially smooth coating, characterized below as "smooth" for the purpose of the present invention, presumes to have a coating composition in which the various components, in the reacted final state, form a coating in which the components are compatible or have been modified to be compatible with one another and further has little, if any, of the characteristics of a "rough" surface.

Figure 4:
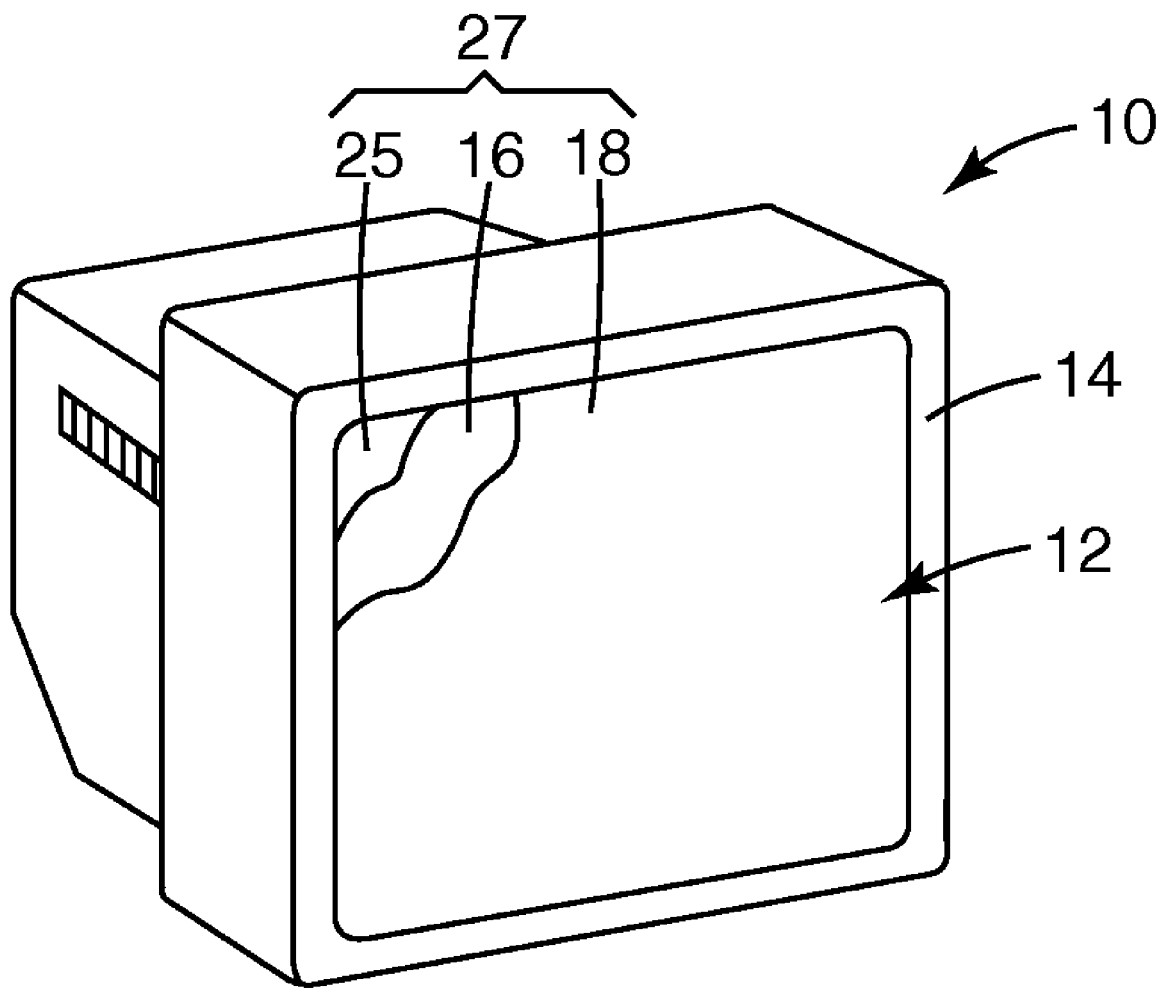
FIG. 4 illustrates an article having a hard coated optical display formed in accordance with an embodiment of the present invention.

Additionally, the hardcoat layer can exhibit an initial haze of less than 2% and/or an initial transmission of at least 90%, Referring now to FIG. 4, a perspective view of an article (here a computer monitor 10) is illustrated as having an optical display 12 coupled within a housing 14. The optical display 12 is a substantially transparent material having optically enhancing properties through which a user can view text, graphics, or other displayed information. The optical display 12 includes hardcoat layer 18 applied to an optical substrate 16. The thickness of the hardcoat layer is typically at least 0.5 microns, in one embodiment at least 1 micron, and in another embodiment at least 2 microns. The thickness of the hardcoat layer is generally no greater than 25 microns. In one embodiment the thickness ranges from 3 microns to 5 microns.

In another embodiment (not shown), the hardcoat layer described herein (i.e. comprising at least one fluoroalkyl pendent siloxane compound and at least one organic polyethylenically unsaturated compound) may be provided as an outermost hardcoat surface layer having an additional hard coat layer underlying the outermost hardcoat surface layer. In this embodiment, the additional hardcoat layer underlying the outermost hardcoat surface layer can have a thickness that is generally not more than 25 micrometers. In one embodiment, the additional hardcoat layer has a thickness from 3 to 5 micrometers.

Various permanent and removable grade adhesive compositions may be coated on the opposite side of the substrate 16 (i.e. to that of the hardcoat layer 18) so the article can be easily mounted to a display surface. Suitable adhesive compositions include but are not limited to (e.g. hydrogenated) block copolymers such as those commercially available from Kraton Polymers of Westhollow, Tex. under the trade designation "Kraton G-1657", as well as other (e.g. similar) thermoplastic rubbers. Other exemplary adhesives include acrylic-based, urethane-based, silicone-based, and epoxy-based-adhesives, in one embodiment, adhesives with sufficient optical, quality and light stability are utilized so that the adhesive does not yellow with time or upon weather exposure so as to degrade the viewing quality of the optical display.

In one embodiment, a pressure sensitive adhesive (PSA) is utilized. The Pressure-Sensitive Tape Council has defined pressure sensitive adhesives as material with the following properties: (1) aggressive and permanent tack, (2) adherence with no more than finger pressure, (3) sufficient ability to hold onto an adherand, (4) sufficient cohesive strength, and (5) requires no activation by an energy source. PSAs are normally tacky at assembly temperatures, which is typically room temperature or greater (i.e., about 20° C. to about 30° C. or greater). Materials that have been found to function well as PSAs are polymers designed and formulated to exhibit the requisite viscoelastic properties resulting in a desired balance of tack, peel adhesion, and shear holding power at the assembly temperature. The most commonly used polymers for preparing PSAs are natural rubber-, synthetic rubber- (e.g., styrene/butadiene copolymers (SBR) and styrene/isoprene/styrene (SIS) block copolymers), silicone elastomer-, poly alpha-olefin-, and various (meth)acrylate- (e.g., acrylate and methacrylate) based polymers. Of these, (meth)acrylate-based polymer PSAs have evolved as a preferred class of PSA for the present invention clue to their optical clarity, permanence of properties over time (aging stability), and versatility of adhesion levels, to name just a few of their benefits.

The adhesive can be applied using a variety of known coating techniques such as transfer coating, knife coating, spin coating, die coating and the like. Exemplary adhesives are described in U.S. Patent Application Publication No. 2003/0012936. Several of such adhesives are commercially available from 3M Company, St. Paul, Minn. under the trade designations 8141, 8142, and 8161.

The substrate 16 may include any of a wide variety of materials, including but not limited to, non-polymeric materials, such as glass, or polymeric materials, such as polyethylene terephthalate (PET), bisphenol A polycarbonate, cellulose triacetate, poly(methyl methacrylate), and biaxially oriented polypropylene which are commonly used in various optical devices. The substrate may also include polyamides, polyimides, phenolic resins, polystyrene, styrene-acrylonitrile copolymers, epoxies, and the like. The hardcoat of the invention can also be used on optical substrates; optical substrates, as used herein include, but are not limited to transparent substrates, transmissive substrates, microstructured substrates, and multilayer film substrates.

Typically the substrate will be chosen based in part on the desired optical and mechanical properties for the intended use. For example, substrates can be chosen with various optical properties, including, but not limited to light, transmission, light reflectance, and opaqueness. Mechanical properties typically will include flexibility, dimensional stability and impact resistance. The substrate thickness typically also will depend on the intended use. For most applications, substrate thicknesses of less than 0.5 mm can be utilized, and in other embodiments, the substrate thickness is from 0.02 to 0.2 mm. In one embodiment self-supporting polymeric films are utilized as the substrate. The polymeric material can be formed into a film using conventional filmmaking techniques such as by extrusion and optional uniaxial or biaxial orientation of the extruded film. The substrate can be treated to improve adhesion between the substrate and the hardcoat layer, e.g., chemical treatment, corona treatment such as air or nitrogen corona, plasma, flame, or actinic radiation. If desired, an optional tie layer or primer can be applied to the substrate and/or hardcoat layer to increase the interlayer adhesion. The substrate can also be a previously coated article having various kinds of layers already coated thereon.

In the case of display panels, the substrate 16 is light transmissive, meaning light can be transmitted through the substrate 16 such that the display can be viewed. Both transparent (e.g. gloss) and matte light transmissive substrates 16 can be employed in display panels 10. Matte substrates 16 typically have lower transmission and higher haze values than typical gloss films. The matte films exhibit this specular property typically due to the presence of micron size dispersed inorganic fillers such as silica that diffuse light. Exemplary matte films are commercially available from U.S.A. Kimoto Tech, Cedartown, Ga. under the trade designation "N4D2A". In case of transparent substrates, hardcoat coated transparent substrates, as well as display articles comprised of transparent substrates, the haze value can be less than 5%, in another embodiment it can be less than 2% and in yet another embodiment it can be less than 1%. Alternatively or in addition thereto, the transmission can be greater than 90%.

Various light transmissive optical films are known, including but not limited to, multilayer optical films, micro structured films such as retroreflective sheeting and brightness enhancing films, (e.g. reflective or absorbing) polarizing films, diffusive films, as well as (e.g. biaxial) retarder films and compensator films such as described in U.S. Pat. No. 7,099,083.

As described in U.S. Pat. No. 6,991,695, multilayer optical films provide desirable transmission and/or reflection properties at least partially by an arrangement of microlayers of differing refractive index. The microlayers have different refractive index characteristics so that some light is reflected at interlaces between adjacent microlayers. The microlayers are sufficiently thin so that light reflected at a plurality of the interfaces undergoes constructive or destructive interference in order to give the film body the desired reflective or transmissive properties. For optical films designed to reflect light at ultraviolet, visible, or near-infrared wavelengths, each microlayer generally has an optical thickness (i.e., a physical thickness multiplied by refractive index) of less than 1 μm, However, thicker layers can also be included, such as skin layers at the outer surfaces of the film, or protective boundary layers disposed within the film that separate packets of microlayers. Multilayer optical film bodies can also comprise one or more thick adhesive layers to bond two or more sheets of multilayer optical film in a laminate.

Further details of suitable multilayer optical films and related constructions can be found in U.S. Pat. No. 5,882,774 (Jonza et al.), and PCT Publications WO 95/17303 (Ouderkirk et al.) and WO 99/39224 (Ouderkirk et al.). Polymeric multilayer optical films and film bodies can comprise additional layers and coatings selected for their optical, mechanical, and/or chemical properties. See U.S. Pat. No. 6,368,699 (Gilbert et al.). The polymeric films and film bodies can also comprise inorganic layers, such as metal or metal oxide coatings or layers.

Hardcoat compositions can also be used to form hardcoat layers on internal components of optical devices. Such hardcoat layers can be useful to minimize damage to the internal components during assembly of the optical device. The use of such hardcoat layers could reduce the occurrence of defective parts prior to and during the assembly process. Further embodiments and discussion of the use of hardcoat layers in internal components can be found in U.S. patent application Ser. No. 11/267,790 entitled "INTERNAL COMPONENTS OF OPTICAL DEVICE COMPRISING HARDCOAT", filed on Nov. 3, 2005, the disclosure of which is incorporated herein by reference.

The hardcoat may be provided as a single layer disposed on a substrate. In this construction, the wt-% of all fluorinated compounds in the hardcoat composition can range from 1 to 40 wt %. In another embodiment, the wt-% of all fluorinated compounds in the hardcoat composition can range from 1 to 20 wt-%. In a further embodiment, the wt-% of all fluorinated compounds in the hardcoat composition can range from 1 to 10 wt-%.

The hardcoat layer is formed from the reaction product of a mixture that includes at least one organic polyethylenically unsaturated compound as discussed above. Such at least one organic polyethylenically unsaturated compound can also be referred to as conventional hard coat materials. Examples of such materials, include, but are not limited to hydrocarbon-based materials well known to those of ordinary skill in the optical arts. In one embodiment, the hydrocarbon-based material is an acrylate-based hard coat material. One exemplary hard coat material for use in the invention is based on PETA (pentaerythritol tri/tetra acrylate). One commercially available form of pentaerythritol triacrylate ("PET3A") is SR444C and one commercially available form of pentaerythritol tetraacrylate ("PET4A") is SR295, each available from Sartomer Company of Exton, Pa. However, other organic polyethylenically unsaturated compounds, such as those exemplified above, may also be used.

It can be advantageous to maximize the concentration of the at least one organic polyethylenically unsaturated, compound particularly since (meth)acrylate crosslinkers are generally less expensive than fluorinated compounds such as fluoroalkyl pendent siloxane compounds as described herein. Accordingly, the compositions described herein typically comprise at least 20 wt-% organic polyethylenically unsaturated compounds. In one embodiment a composition may include at least 50 wt organic polyethylenically unsaturated compound, and may be for example at least 60 wt-%, at least 70 wt-%, at least 80 wt-%, at least 90 wt-% and at least 95 wt-% organic polyethylenically unsaturated compound.

To facilitate curing, compositions may further comprise at least one polymerization initiators, as discussed and exemplified above.

If desired, the composition may further comprise an organic solvent or mixed solvent. The organic solvent used in the free radical crosslinking reaction can be any organic liquid that is inert to the reactants and product, and that will not otherwise adversely affect the reaction. Suitable solvents include alcohols such as methanol, ethanol, isopropanol and carbitol, esters such as ethyl acetate, aromatic solvents such as toluene, chlorinated or fluorinated solvents such as $CHCl_3$ and $C_4F_9OCH_3$, ethers such as diethyl ether, THF and t-butyl methyl ether, and ketones, such as acetone and methyl isobutyl ketone. Other solvent systems may also be used. The amount of solvent can generally be about 20 to 90 percent by weight of the total weight of reactants and solvent. It should be noted that in addition to solution polymerization, the crosslinking can be affected by other well-known techniques such as suspension, emulsion, and bulk polymerization techniques.

The composition whose reaction product will be the hardcoat layer can be applied to a substrate layer such as a light transmissible substrate and photocured to form an easy to clean, stain and ink repellent, hardcoat layer.

The composition for use as the surface layer or underlying hardcoat layer can also include inorganic particles that can add mechanical strength or other desirable properties to the resultant coating. The infrared absorbing nanoparticles that were discussed above with respect to the solar control article are one example of such inorganic particles. In one embodiment, the inorganic particles can be surface modified particles. Surface modified particles are generally described in U.S. Pat. No. 6,376,590 and U.S. Patent Application Publication No. 2006/0148950, the disclosures of which are incorporated herein by reference.

A variety of inorganic oxide particles can be used in the hardcoat. The particles are typically substantially spherical in shape and relatively uniform in size. The particles can have a substantially monodisperse size distribution or a polymodal distribution obtained by blending two or more substantially monodisperse distributions. The inorganic oxide particles are typically non-aggregated substantially discrete), as aggregation can result in precipitation of the inorganic oxide particles or gelation of the hardcoat. The inorganic oxide particles are typically colloidal in size, having an average particle diameter of 0.001 to 0.2 micrometers, less than 0.05 micrometers, and less than 0.03 micrometers. These size ranges can facilitate dispersion of the inorganic oxide particles into the binder resin and provide ceramers with desirable surface properties and optical clarity. The average particle size of the inorganic oxide particles can be measured using transmission electron microscopy to count the number of inorganic oxide particles of a given diameter.

The inorganic oxide particles can include a single oxide such as silica, or can comprise a combination of oxides, such as silica and aluminum oxide, or a core of an oxide of one type (or a core of a material other than a metal oxide) on which is deposited an oxide of another type. Silica is a common inorganic particle.

The inorganic oxide particles are often provided in the form of a sol containing a colloidal dispersion of inorganic oxide particles in liquid media. The sol can be prepared using a variety of techniques and in a variety of forms including hydrosols (where water serves as the liquid medium), organosols (where organic liquids so serve), and mixed sols (where the liquid medium contains both water and an organic liquid), e.g., as described in U.S. Pat. No. 5,648,407 (Goetz et al.); U.S. Pat. No. 5,677,050 (Bilkadi et al.) and U.S. Pat. No. 6,299,799 (Craig et al), the disclosure of which is incorporated by reference herein. Aqueous sols (e.g. of amorphous silica) can be employed. Sols generally contain at least 2 wt-%, at least 10 wt-%, at least 15 wt-%, at least 25 wt-%, and often at least 35 wt-% colloidal inorganic oxide particles based on the total weight of the sol. The amount of colloidal inorganic oxide particle is typically no more than 50 wt-% (e.g. 45 wt-%). The surface of the inorganic particles can be "acrylate functionalized" as described in U.S. Pat. No. 5,677,050. The sols can also be matched to the pH of the binder, and can contain counterions or wafer-soluble compounds (e.g., sodium aluminate), all as described in U.S. Pat. No. 6,238,798 (Kang et al.).

One example of such particles is colloidal silica reacted with a methacryl silane coupling agent such as A-174 (available from Natrochem, Inc.), other dispersant aids such as N,N dimethylacrylamide and various other additives (stabilizers, initiators, etc.).

A particulate matting agent can also be incorporated into the polymerizable composition in order to impart anti-glare properties to the surface layer. The particulate matting agent can also prevent the reflectance decrease and uneven coloration caused by interference with an associated hard coat layer. The particulate matting agent is generally transparent, exhibiting transmission values of greater than about 90%. Alternatively, or in addition thereto, the haze value can be less than 5%, and in one embodiment is less than 2%, and in another embodiment is less than 1%.

Exemplary systems incorporating matting agents into a hard coating layer, but having a different hard coating composition, are described, for example, in U.S. Pat. No. 7,101,618, and incorporated herein by reference. Further, exemplary matte films are commercially available from U.S.A. Kimoto Tech of Cedartown, Ga., under the trade designation "N4D2A."

The amount of particulate matting agent added can be between 0.5 and 10 wt-%, depending upon the thickness of the hardcoat layer. In one embodiment, it is around 2 wt-%, A hardcoat layer that is to also function as an anti-glare layer can have a thickness of 0.5 to 10 microns, in another embodiment 0.8 to 7 microns, which is generally in the same thickness range of gloss hard coatings.

The average particle diameter of the particulate matting agent has a predefined minimum and maximum that is partially dependent upon the thickness of the layer. However, generally speaking, average particle diameters below 1.0 microns do not provide the degree of anti-glare sufficient to warrant inclusion, while average particle diameters exceeding 10.0 microns deteriorate the sharpness of the transmission image. The average particle size is thus generally between 1.0 and 10.0 microns, and in another embodiment is between 1.7 and 3.5 microns, in terms of the number-averaged value measured by the Coulter method.

As the particulate matting agent, inorganic particles or resin particles are used including, for example, amorphous silica particles, $TiO_2$ particles, $Al_2O_3$ particles, cross-linked acrylic polymer particles such as those made of cross-linked poly(methyl methacrylate), cross-linked polystyrene particles, melamine resin particles, benzoguanamine resin particles, and cross-linked polysiloxane particles. By taking into account the dispersion stability and sedimentation stability of the particles in the coating mixture for the anti-glare layer and/or the hard coat layer during the manufacturing process, resin particles can be utilized, and in one embodiment cross-linked polystyrene particles can be used since resin particles have a high affinity for the binder material and a small specific gravity.

As for the shape of the particulate matting agent, spherical and amorphous particles can be used. However, to obtain a consistent anti-glare property, spherical particles are desirable. Two or more kinds of particulate materials may also be used in combination.

Hardcoat compositions can be applied to a substrate 16 to form a hardcoat layer 18 using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Many types of die coaters are described in the literature such as by Edward Cohen and Edgar Gutoff, Modern Coating and Drying Technology, VCH Publishers, NY 1992, ISBN 3-527-28246-7 and Cutoff and Cohen, Coating and Drying Defects: Troubleshooting Operating Problems, Wiley Interscience, NY ISBN 0-471-59810-0.

A die coater generally refers to an apparatus that utilizes a first die block and a second die block to form a manifold cavity and a die slot. The coating fluid, under pressure, flows through the manifold cavity and out the coating slot to form a ribbon of coating material. Coatings can be applied as a single layer or as two or more superimposed layers. Although it is usually convenient for the substrate to be in the form of a continuous web, the substrate may also be a succession of discrete sheets.

A variety of substrates can be utilized. Suitable substrate materials include, but not limited to, fibrous substrates, such as woven, non-woven and knit fabrics, textiles, carpets, leather, and paper, and hard, substrates, such as vinyl, wood, glass, ceramic, masonry, concrete, natural stone, man-made stone, grout, metal sheets and foils, wood, paint, plastics, and films of thermoplastic resins, such as polyesters, polyamides (nylon), polyolefins, polycarbonates and polyvinylchloride, and the like. Substrates of particular interest are those substrates which are optically clear.

The adhesion between the substrate and the hardcoat layer can be improved when the substrate is chosen based in part on the presence of reactive groups that are capable of forming a covalent or hydrogen bond with reactive groups in the coating composition. Examples of such reactive group include, but are not limited to, chloride, bromide, iodide, alkene (C=C), alkyne, —OH, —$CO_2$, CONH groups and the like. The substrate can be treated to further improve the adhesion between the substrate and the hardcoat layer, e.g., by incorporating reactive groups into the substrate surface though chemical treatment, etc. If desired, an optional tie layer or primer can be applied to the substrate and/or hardcoat layer to increase the interlayer adhesion.

EXPERIMENTAL

Materials

Unless otherwise noted, as used in the examples, "HFPO—" refers to the end group F(CF($CF_3$)$CF_2O$)$_x$CF($CF_3$)—. HFPO—$CO_2CH_3$ is F(CF($CF_3$)$CF_2$O)xCF($CF_3$)C(O)$OCH_3$ prepared according to the method reported in U.S. Pat. No. 3,250,808 (Moore et al.), the disclosure of which is incorporated herein by reference, with purification by fractional distillation.

HFPO—OH, HFPO—C(O)NHCH$_2$CH$_2$OH, prepared according to published patent, described in paragraph [0058], U.S. Publication No. 20060148350 from HFPO—C(O)OCH$_3$ (MW ~1313) and NH$_2$CH$_2$CH$_2$OH, Average molecule weight is about 1344.

HFPO-MA, HFPO—C(O)N(H)CH$_2$CH$_2$OC(O)C(CH$_3$)=CH$_2$ is made from HFPO—OH by a procedure similar to that described in U.S. Publication No. 20040077775, for synthesis of (HFPO)$_k$-methacrylate.

HFPO—C(O)NHCH$_2$CH=CH$_2$ (HFPO-AA) is prepared in according to published patent, described in paragraph [0058], US 20060148350 from HFPO—C(O)OCH$_3$ and NH$_2$CH$_2$CH=CH$_2$, in replacement of NH$_2$CH$_2$CH$_2$OH. Average molecule weight is about 1045.

Poly(methylphenylsiloxane-co-methylhyhydrosiloxane), —(SiMePh-O)x-(SiMeH—O)y-(PS129.5 containing 45~50% methylhydrosiloxane available from Huls Petrarch Systems, Bristol, Pa.).

Trimethylsilyl terminated poly(dimethylsiloxane-co-methylhydrosiloxane), Me$_2$SiO—(SiMe$_2$-O)x-(SiMeH—O)y-SiMe$_3$ containing 50-55% dimethylsiloxane; available from Aldrich.

Polymethylhydrosiloxane, —(SiMeH—O)y-(PS-120 available from Huls Petrarch Systems, Bristol, Pa.).

Vinyltrimethoxylsilane, CH$_2$=CHSi(OMe)$_3$, available from Aldrich.

TMPTA, trimethylolpropane triacrylate, (SR351 available from Sartomer Company, Exton, Pa.).

D-1173, (Darocur™ 1173; 2-hydroxy-2-methyl-1-phenyl-propan-1-one, initiator, available from Ciba Specialty Chemicals, Tarrytown N.Y.).

Pt-1: Catalyst, 3~3.5% Platinum-divinyl tetramethyl disiloxane complex in vinyl terminated silicone available from Gelest, Inc., Morrisville Pa., and diluted to 0.15% solution with heptane.

Pt-2: Hydrogen hexachloroplatinate (IV) hydrate available from Aldrich, and diluted in diglyme at ~7.5% solution for use.

tBME: t-Butyl methyl ether, available from EMD Chemicals Inc., Gibbstown, N.J.

MEK: Methyl ethyl ketone, available from EM Industries, Inc., Gibbstown, N.J.

ATO-1, refers to an antimony tin oxide (ATO) coating formulation that includes 62.5% ATO (from Inframat Corporation, Farmington Conn.), 15% HDDA (1,6-hexanediol diacrylate, SR238 from Sartomer, Exton Pa.), 15% PETA (Pentaerythritol triacrylate, PETA-K from UCB-Radcure, Smyrna Ga.), and 7.5% polymeric dispersant (Solplus D510 from Noveon Inc., Cleveland Ohio), The dispersion was milled for 8 hours using Netzsch LME-1 Disk Mill with MoliNEx™ eccentric disks and one liter stainless steel chamber (Netzsch Incorporated, Exton Pa.). The final particle size was ~60 nm (PDI=0.21) measured by Zetasizer Nano ZS (Malvern Instruments Ltd, Worcestershire, UK). ATO-1 was then made by making a 45% solution of the formulation in 1-methoxy-2-propanol. The solution was diluted to 30%) solution with methyl ethyl ketone, or t-butyl methyl ether for formulation, and 2% D-1173 photoinitiator was added.

ATO-2, refers to an ATO coating formulation included 80 g TRB Paste 6070 (purchased from Advanced Nano Products, S. Korea); and 20 g ATO premix formulation that includes: 24.58% HDD A, 1.59% Tinuvin 123 (Ciba), 1.11% Irgacure 819 (Ciba), 1.11% Irgacure 184 (Ciba), and 71.36%) MEK.

FA-1, a fluorinated hydrosiloxane with $C_4F_9$—, HMe$_2$Si—[—SiHMe]y-[O—SiMeC$_2$H$_4$C$_4$F$_9$]x—OSiMe$_2$H, available from Dow Corning, Midland, Mich. as Q2-7560, diluted with heptane in 10%.

FA-2, a fluorinated vinylsiloxane with $C_4F_9$—. CH$_2$=CHSi Me$_2$-[O—SiMe$_2$]y-[O—SiMeC$_2$H$_4$C$_4$F$_9$]x—OSiMe$_2$CH=H$_2$, available from Dow Corning, Midland, Mich. as Q2-7785, 10% solution in heptane.

FA-3, a fluorinated hydrosiloxane with FA-1 and FA-2 in 1/9 ratio by weight, and diluted with heptane in 10% solution.

FA-4, a fluorinated hydrosiloxane with FA-1 and FA-2 in 4/6 ratio by weight, and diluted with heptane in 10% solution.

FA-5,

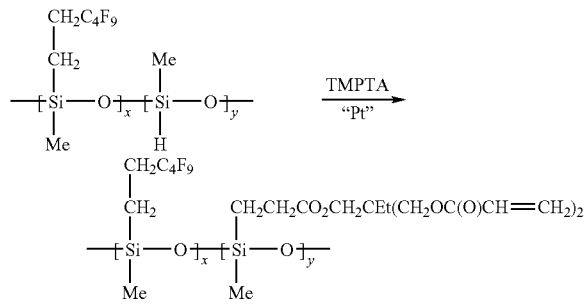

a fluorinated siloxane with multiacrylate group, was made from the hydrosilylation of Q2-7560 with excess TMPTA in 17/83 ratio by weight (20% solution in MEK). In a 50 ml flask, 0.52 g Q2-7560, 2.506 g TMPTA, 10.021 g t-BME and 2.015 g heptane were charged. From FTIR analysis of the solution, the signal at 2165.31 cm$^{-1}$ was assigned to Si—H from Q2-7560, and 1635.42/1621.92 cm$^{-1}$ were assigned to $CH_2$=$CHCO_2$— from TMPTA. 3 drops of Pt-2 was added, and the solution was reacted at 66° C. for one hour under nitrogen. From FTIR analysis, the signal at 2165.31 cm$^{-1}$ from Si—H was disappeared, with decreased signal at 1634.95 cm$^{-1}$ and 1621.24 cm$^{-1}$, indicating the hydrosilylation. The 20% solution, was used as an additive.

FA-6, a fluorinated siloxane with multiacrylate group, was made from the hydrosilylation of Q2-7560 with excess TMPTA in ½ by weight, 20% solution in MEK. In a 50 ml flask, charged with 1.013 g Q2-7560, 2.013 g TMPTA, 8.975 g t-BME and 2.883 g Heptane. From FTIR analysis of the solution, the signal at 2165.31 cm$^{-1}$ was assigned to Si—H from Q2-7560, and 1635.42/1621.92 cm$^{-1}$ were assigned to $CH_2$=$CHCO_2$— from TMPTA. 3 drops of Pt-2 was added, and the solution was reacted at 66° C. for one hour under nitrogen. From FTIR analysis, the signal at 2165.31 cm$^{-1}$ from Si—H was disappeared, with decreased signal at 1635.02 cm$^{-1}$ and 1620.46 cm$^{-1}$, indicating the hydrosilylation. The 20% solution was used as an additive.

FA-7,

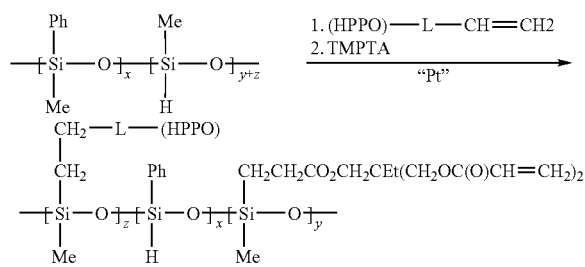

a fluorinated siloxane with HFPO tail and multiacrylate group, was made from the hydrosilylation of poly(methylhydrosiloxane/methyl-phenylsiloxane) with (HFPO)xC(O)NHCH$_2$CH=CH$_2$ and excess TMPTA in the ratio of 1.5/1/2.5 by weight (23.8% solution). In a 50 ml flask, charged with 1.5289 g poly(methylphenylsiloxane-co-methylhyhydrosiloxane), 1.006 g HFPO—C(O)NHCH$_2$CH=CH$_2$, 0.107 g Pt-2 (7.5% in diglyme) and 16.027 g t-BME. The mixture was reacted at 65° C. for one hour under nitrogen. From FTIR analysis, the signal at 2159.34 cm$^{-1}$, assigned to Si—H was decreased, and the CH$_2$=CHCH$_2$— signal was disappeared. Then, 2.51 g TMPTA was added at room temperature and reacted at 65° C. for another hour. From FTIR analysis, the signal at 2159.34 cm$^{-1}$ from Si—H was disappeared with acrylate signal from TMPTA. The 23.8% solution was diluted with MEK to 20% solution for evaluation as an additive.

FA-8,

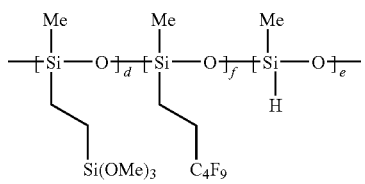

trimethoxysilane containing fluorinated siloxane, Q2-7560/CH$_2$—CHSi(OMe)$_3$ was made as follows. In a flask with a magnetic stir bar, 20 g Q2-7560 was mixed with 11.70 g CH$_2$=CHSi(OMe)$_3$ (MW=148.24, 78.9 meq CH$_2$=CH—) under nitrogen. From FTIR analysis, the absorption at 2167.09 cm$^{-1}$ was assigned to Si—H, and 1599.79 cm$^{-1}$ for CH$_2$=CH—. The solution was added 5 drops of 0.15% Platinum catalyst (Pt-1) and reacted at 70° C. for 8 hours with a magnetic stirring under nitrogen. From FTIR analysis, the signal of Si—H at 2160.31 cm$^{-1}$ was significantly reduced, and the signal of CH$_2$=CH— at 1599.79 cm$^{-1}$ was disappeared, indicating the completed hydrisilsilation addition of CH$_2$=CHSi(OMe)$_3$ to Q2-7560. 3 g of the sample was diluted with 7 g t-BuOMe to give 10 g clear solution (30%) for evaluation.

FA-9,

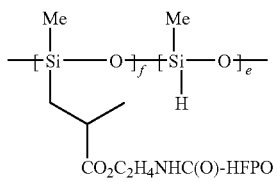

fluorinated hydrosiloxane with HFPO, polymethylhydrosiloxane/HFPO-MA was made as follows. In a 50 ml bottle, 1.0 g polymethylhydrosiloxane (—(SiMeH—O)y-). 1.0 g HFPO-MAr, 3.0 g t-BuOMe were charged under nitrogen. From FTIR analysis, the signal of Si—H at 2163.76 cm$^{-1}$ and CH$_2$—CMeCO— at 1641.05 cm$^{-1}$ were identified. 3 drops of Pt-2 was added, and the mixture was reacted at 70° C. for two hours. From FTIR, the signal at 1641.05 cm$^{-1}$ was disappeared, and the signal of Si—H at 2167.07 cm$^{-1}$ was reduced, indicating the hydrosilylation. 1.67 g t-BuOMe was added for making ~30% solution for evaluation, FA-10, fluorinated hydrosiloxane with HFPO, polymethylhydrosiloxane/HFPO-MA: In a 50 ml bottle, 1.0 g polymethylhydrosiloxane (—(SiMeH—O)y-), 2.0 g HFPO-MAr, 6.0 g t-BuOMe were charged under nitrogen. After the addition of 3 drops of Pt-2 catalyst, the bottle was sealed, and the mixture was reacted at 70° C. for two hours. From FTIR, the signal of CH$_2$=CHCO$_2$— at 1640.27 cm$^{-1}$ was disappeared, and the signal of Si—H at 2163.67 cm$^{-1}$ was reduced, indicating the reaction of hydrosilylation. 1.0 g t-BuOMe was added to make a ~30% solution for evaluation.

FA-11, fluorinated hydrosiloxane with HFPO, poly(dimethyl-methylhydrosilloxane)/HFPO-MA; In a 50 ml bottle, 1.0 g trimethylsilyl terminated poly(dimethylsiloxane-co-methylhydrosiloxane), 1.0 g HFPO-MAr, 3.0 g t-BuOMe were charged under nitrogen. After the addition of 3 drops of Pt-2 catalyst, the bottle was sealed, and the mixture was reacted at 70° C. for two hours. From FTIR, the signal of $CH_2CHCO_2$— at 1640.69 cm$^{-1}$ was disappeared, and the signal of Si—H at 2160.28 cm$^{-1}$ was reduced, indicating the reaction of hydrosilylation. 1.67 g t-BuOMe was added to make a ~30% solution for evaluation.

FA-12, fluorinated hydrosiloxane with HFPO, poly(dimethyl-methylhydrosilloxane)/HFPO-MA: In a 50 ml bottle, 1.0 g trimethylsilyl terminated poly(dimethylsiloxane-co-methylhydrosiloxane), 2.0 g HFPO-MAr, 6.0 g t-BuOMe were charged under nitrogen. After the addition of 3 drops of Pt-2 catalyst, the bottle was sealed, and the mixture was reacted at 70° C. for two hours. From FTIR, the signal of $CH_2=CHCO_2$— at 1639.30 cm$^{-1}$ was disappeared, and the signal of Si—H at 2159.95 cm$^{-1}$ was reduced, indicating the reaction of hydrosilylation. 1.0 g t-BuOMe was added to make a ~30% solution for evaluation.

Method for Determining Contact Angle:

The coatings were rinsed for 1 minute by hand agitation in IPA before being subjected to measurement of water and hexadecane contact angles. Measurements were made using as-received reagent-grade hexadecane "oil" (Aldrich) and deionized water filtered through a filtration system obtained from Millipore Corporation (Billerica, Mass.), on a video contact angle analyzer available as product number VCA-2500XE from AST Products (Billerica, Mass.), Reported values are the averages of measurements on at least three drops measured on the right and the left sides of the drops. Drop volumes were 5 µL for static measurements and 1-3 µL for advancing and receding. For hexadecane, only advancing and receding contact angles are reported because static and advancing values were found to be nearly equal.

Method for Determining Marker Repellency:

For this test one of the Sharpie Permanent Marker, Vis-á-vis Permanent Overhead Project Pen or King Size Permanent Marker (all commercially available from Sanford, USA) were used as the marker. First, the tip of the selected marker was cut with a razor blade to provide a wide flat marking tip. Then, using the marker and an edge of a straight ruler as a guide, a straight line was drawn over the sample coatings applied over a PET substrate at an approximate speed of 15 cm per second. The appearance of the straight line drawn on the coatings was viewed and a number was assigned to reflect the degree of repellency of the sample coating towards markers. An assigned number of 1 indicates excellent repellency while an assigned number of 5 indicates poor repellency. Depending on the type of marker used, the results are reported as Sharpie test. Vis-á-vis test or King marker test. Method for Determining Solvent Resistance: For this test, a drop (about 1.25 cm in diameter) of methyl ethyl ketone (MEK) or other organic solvent was placed on a sample coating applied over a PET substrate, and was allowed to dry at room temperature. Afterwards, the sample coating was visually observed for appearance and rated either as Haze (H), indicating poor solvent repellency or Clear (C), indicating good solvent repellency. Furthermore, using the above "method for marker test", the sharpie test was repeated on the spot where a drop of MEK or organic solvent repellency test, was conducted, and a marker repellency number ranging from 1 to 5 was assigned.

Steel Wool Testing:

The abrasion resistance of the cured films was tested crossweb to the coating direction by use of a mechanical device capable of oscillating cheesecloth or steel wool fastened to a stylus (by means of a rubber gasket) across the film's surface. The stylus oscillated over a 10 cm wide sweep width at a rate of 3.5 wipes/second wherein a "wipe" is defined as a single travel of 10 cm. The stylus had a flat, cylindrical geometry with a diameter of 1.25 inch (3.2 cm). The device was equipped with a platform on which weights were placed to increase the force exerted by the stylus normal to the film's surface. The cheesecloth was obtained from Summers Optical, EMS Packaging, a subdivision of EMS Acquisition Corp., Hatsfield, Pa. under the trade designation "Mil Spec CCC-c-440 Product #S12905". The cheesecloth was folded into 12 layers. The steel wool was obtained from Rhodes-American, a division of Homax Products, Bellingham, Wash. under the trade designation "#0000-Super-Fine" and was used as received. A single sample was tested for each example, with the weight in grams applied to the stylus and the number of wipes employed during testing reported. No visible scratching is reported in the Tables as "NS".

UV Curable ATO Hardcoat Formulations with Fluorinated Siloxane as Additives

The formulations of ATO hardcoat with different fluorinated siloxane additives (FA) are listed in Table I with the observed coating quality; "Dewet" indicated that an acceptable coating was not achieved.

Modified ATO-1 nano-particle hardcoat was added with 1% D1173 photo-initiator (10% solution in MEK), and then diluted with MEK or t-BME to 20~30% solution. A hydrosilylation catalyst, platinum-divinyltetamethydisiloxane complex (Pt-1), was added at 0.015% by weight when fluorochemical siloxane additive solutions with Si—H functional group were formulated with ATO hardcoat. The detailed formulations in different ratio by weight were summarized in Table I, which were coated on PET film with No. #10 wire rod. The coated films were dried in 110° C. oven for ~5 minutes, then UV-cured using a Fusion Systems (Gaithersburg, Md.) 500 watt H-bulb under Nitrogen at 20 feet per minutes. The marker repellency (ratings from 1 to 5, with 1 being the best repellency), contact angle data and solvent resistant (Clear or Hazy with subsequent marker repellency test) results are summarized in Table II and III. Steel wool durability test results from representative formulations were reported in Table IV.

TABLE I

ATO Hardcoat Formulations with Fluorinated-siloxane Additive

| Formulation No# | ATO-1 (% solution) | FA (Solvent) | ATO/FA (by weight) | Coating Quality |
|---|---|---|---|---|
| 1 | 20% (MEK) | FA-1 (Heptane) | 99.5/0.5 | Good |
| 2 | 20% (MEK) | FA-1 (Heptane) | 99/1 | Good |
| 3 | 20% (MEK) | FA-1 (Heptane) | 98/2 | Good |
| 4 | 20% (MEK) | FA-2 (Heptane) | 99.75/0.25 | Dewet |
| 5 | 20% (MEK) | FA-2 (Heptane) | 99.5/0.5 | Dewet |
| 6 | 20% (MEK) | FA-2 (Heptane) | 99/1 | OK |
| 7 | 30% (tBME) | FA-2 (Heptane) | 98/2 | OK |
| 8 | 30% (tBME) | FA-3 (Heptane) | 99/1 | Good |
| 9 | 30% (tBME) | FA-3 (Heptane) | 98/2 | Good |
| 10 | 30% (tBME) | FA-4 (Heptane) | 99/1 | Good |
| 11 | 30% (tBME) | FA-4 (Heptane) | 98/2 | Good |
| 12 | 20% (MEK) | FA-5 (tBME) | 99/1 | Good |
| 13 | 20% (MEK) | FA-6 (tBME) | 99/1 | OK |
| 14 | 20% (MEK) | FA-6 (tBME)/FA-2 (Heptane) | 99/0.5/0.5 | Dewet |
| 15 | 20% (MEK) | FA-7 (tBME) | 99/1 | Good |
| 16 | 30% (MEK) | FA-7 (tBME) | 99/1 | Good |
| 17 | 30% (MEK) | FA-7 (tBME) | 98/2 | Good |
| 18 | 30% (MEK) | FA-7 (tBME) | 95/5 | Good |
| 19 | 30% (MEK) | FA-5/FA-7 (Heptane) | 99/0.5/0.5 | Good |
| 20 | 30% (tBME) | FA-8 (tBME) | 99.5/0.5 | Good |
| 21 | 30% (tBME) | FA-8 (tBME) | 99/1 | Good |

TABLE I-continued

ATO Hardcoat Formulations with Fluorinated-siloxane Additive

| Formulation No# | ATO-1 (% solution) | FA (Solvent) | ATO/FA (by weight) | Coating Quality |
|---|---|---|---|---|
| 22 | 30% (tBME) | FA-8 (tBME) | 98/2 | Good |
| 23 | 30% (tBME) | FA-9 (tBME) | 98/2 | Good |
| 24 | 30% (tBME) | FA-9 (tBME) | 95.5/4.5 | Good |
| 25 | 30% (tBME) | FA-10 (tBME) | 95/5 | Good |
| Control-1 | ATO-1 | None | 100/0 | Good |
| Control-2 | ATO-2 | HFPO-U-(Ar)n* (MEK) | 99.94/0.06 | Good |

*HFPO-U-(Ar)n was HFPO-OH/N100/SR-444C (15/100/88.5), made with the following procedure: A 500 ml round bottom 2-necked flask equipped with magnetic stir bar was charged with 25.00 g (0.131 eq, 191 EW) Des N100, 26.39 g (0.0196 eq, 1344 EW) $F(CF(CF_3)CF_2O)_{6.85} CF(CF_3)C(O)NHCH_2CH_2OH$, and 109.62 g MEK, and was swirled to produce a homogeneous solution. The flask was placed in an 80 degrees Celsius bath, charged with 2 drops of dibutyltin dilaurate catalyst, and fitted with a condenser. The reaction was cloudy at first, but cleared within two minutes. At about 1.75 hours, the flask was removed from the bath and 2.42 g of MEK was added to compensate for lost solvent. A 2.0 g sample was removed from the flask, leaving (1-(2.0/161.01) or 0.9876 weight fraction, of the reaction, and 57.51 g (98.76% of 58.23 g) (0.116 mol, 494.3 equivalent weight) SR- 444C was added to the reaction, which was placed in a 63 degrees Celsius bath. At about 5.25 hours FTIR showed no isocyanate absorption at 2273 $cm^{-1}$, and 0.56 g MEK was added to compensate for solvent lost to bring the material to 50% solids. The product had a calculated wt % F of 15.6% F.

TABLE II

Marker Repellent and Contact Angle Results with Fluorinated Siloxane Additives

| Formulation No# | Sharpie Test | King Size Test | Vis-à-vis Test | $H_2O$ Contact Angle Adv/Rec/Static (°) | Oil Contact Angle Adv/Rec/Static (°) |
|---|---|---|---|---|---|
| 1 | 1 | 1 | 1 | 113/100/112 | 34/30/32 |
| 2 | 1 | 1 | 1 | 112/93/105 | 33/28/31 |
| 3 | 1 | 1 | 1 | 108/93/105 | 35/30/32 |
| 5 | 1 | 1 | 1 | 103/80/98 | 53/38/54 |
| 6 | 1 | 1 | 1 | 109/97/105 | 49/37/45 |
| 8 | 1 | 1 | 1 | 101/85/99 | 39/28/33 |
| 9 | 1 | 1 | 1 | 108/85/108 | 41/28/39 |
| 10 | 1 | 1 | 1 | 107/85/99 | 46/29/43 |
| 11 | 1 | 1 | 1 | 109/88/100 | 40/29/39 |
| 12 | 2 | 2 | 2 | 97/80/97 | 52/47/53 |
| 13 | 1 | 1 | 1 | 103/86/100 | 55/39/50 |
| 14 | 1 | 1 | 1 | 121/82/113 | 68/35/53 |
| 15 | 2 | 1 | 1 | 104/82/98 | 60/44/59 |
| 16 | 1 | 1 | 1 | 107/81/99 | 62/34/60 |
| 17 | 1 | 1 | 1 | 113/83/105 | 61/29/60 |
| 18 | 1 | 1 | 1 | 105/81/108 | 66/32/63 |
| 19 | 1 | 1 | 1 | 105/77/99 | 56/37/52 |
| 20 | 1 | 1 | 1 | 100/81/97 | N/A |
| 21 | 1 | 1 | 1 | 101/85/100 | N/A |
| 22 | 1 | 1 | 1 | 102/82/98 | N/A |
| 23 | 1 | 1 | 1 | 101/—/94 | 68/45/66 |
| 24 | 1 | 1 | 1 | 102/—/97 | 70/40/65 |
| 25 | 1 | 1 | 1 | 106/84/104 | 72/42/66 |
| Control-1 | 5 | 5 | 5 | 79/45/71 | 10/5/13 |
| Control-2 | 3 | 5 | 3 | 110/53/99 | 55/43/54 |

TABLE III

Solvent Resistance and Sharpie Repellent with Fluorinated Siloxane Additives

| Formulation No# | IPA | Toluene | MIBK | Acetone | EtOAc | MEK | DMF |
|---|---|---|---|---|---|---|---|
| 1 | C/1 | C/1 | C/1 | C/1 | C/1 | C/1 | C/1 |
| 2 | C/1 | C/1 | C/1 | C/1 | C/1 | C/1 | C/1 |
| 3 | C/1 | C/1 | C/1 | C/1 | C/1 | C/1 | C/1 |
| 6 | C/1 | C/1 | C/1 | C/1 | C/1 | C/1 | C/1 |
| 8 | C/2 | C/2 | C/2 | C/2 | C/2 | C/2 | C/2 |
| 10 | C/2 | C/2 | C/2 | C/2 | C/2 | C/2 | C/2 |
| 12 | C/1 | C/1 | C/1 | C/1 | C/1 | C/1 | C/1 |
| 18 | C/1 | C/1 | C/1 | C/1 | C/1 | C/1 | C/1 |
| 20 | C/1 | C/1 | C/1 | C/1 | C/1 | C/1 | C/1 |
| 23 | C/1 | C/1 | C/1 | C/1 | C/1 | C/1 | C/1 |
| Control-1 | C/5 | C/5 | C/5 | C/5 | C/5 | C/5 | C/5 |
| Control-2 | C/3 | C/3 | C/3 | C/3 | C/3 | C/3 | C/3 |

TABLE IV

Steel Wool Durability Test Results*

| | Before | After steel wool test | | | |
|---|---|---|---|---|---|
| Experimental No# | steel wool Sharpie repellence | Sharpie repellence | Coating Appearance | $H_2O$ Contact Angle Adv/Rec/Static | Oil Contact Angle Adv/Rec/Static |
| 1 | Y | Y | NS | 108/97/105 | 50/43/47 |
| 2 | Y | Y | NS | 111/90/110 | 49/42/47 |
| 3 | Y | Y | NS | 110/89/103 | 52/46/50 |
| 5 | Y | Y | NS | 107/—/96 | N/A |
| 14 | Y | Y | NS | 109/80/105 | N/A |
| 20 | Y | Y | NS | 99/76/95 | N/A |
| Control-1 | No | No | NS | N/A | N/A |
| Control-2 | Y | No | NS | 66/15/65 | 27/13/25 |

*Steel wool test by 1.25 inch stylus, 500 g weight and 300 rubs.

The invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

We claim:

1. An article comprising:
   an infrared light reflecting multilayer film having alternating layers of a first polymer type and a second polymer type; and
   a hardcoat layer disposed on the multilayer film, wherein said hardcoat layer comprises the reaction product of a hardcoat composition comprising:
   at least one organic polyethylenically unsaturated compound;
   at least one fluoroalkyl pendent siloxane compound;
   infrared light absorbing nanoparticles; and
   at least one polymerization initiator.

2. The article according to claim 1, wherein the at least one fluoroalkyl pendent siloxane compound is

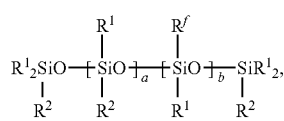
(Formula I)

wherein
$R^1$ is a monovalent hydrocarbyl organic group;
$R^2$ is $R^1$ or an ethylenically or multi-ethylenically unsaturated group Z;
$R^f$ is a fluoroalkyl group, or a perfluorpolyether group;
a is 0 to 2000;
b is 1 to 2000;
with the proviso that a+b is at least 5, and at least two of said $R^2$ groups are Z.

3. The article according to claim 2, wherein the at least one fluoroalkyl pendent siloxane compound is:

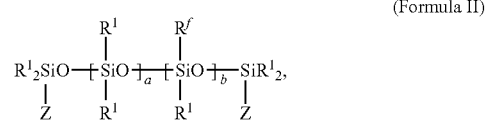
(Formula II)

wherein $R^1$ is a monovalent hydrocarbyl organic group;
$R^f$ is a fluoroalkyl group, or a perfluorpolyether group;
a is 0 to 2000;
b is 1 to 2000,
with the proviso that a+b is at least 5.

4. The article according to claim 2, wherein the at least one fluoroalkyl pendent siloxane compound is:

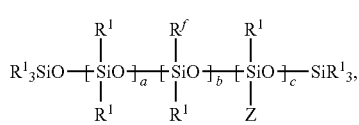
(Formula III)

$R^1$ is a monovalent hydrocarbyl organic group;
Z is an ethylenically or multi-ethylenically unsaturated group;
$R^f$ is a fluoroalkyl group, or a perfluorpolyether group;
a is 0 to 2000;
b is 1 to 2000;
c is 2 to 2000,
with the proviso that a+b+c is at least 5, and at least two of said $R^2$ groups are Z.

5. The article according to claim 2, wherein the at least one fluoroalkyl pendent siloxane compound is

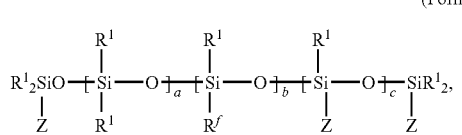
(Formula IV)

$R^1$ is a monovalent hydrocarbyl organic group;

Z is an ethylenically or multi-ethylenically unsaturated group;
$R^f$ is a fluoroalkyl group, or a perfluorpolyether group;
a is 0 to 2000;
b is 1 to 2000;
c is 2 to 2000,
with the proviso that a+b is at least 5.

6. The article according to claim 2, wherein the fluoroalkyl pendent siloxane compound is

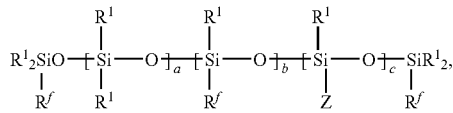

(Formula V)

$R^1$ is a monovalent hydrocarbyl organic group;
Z is an ethylenically or multi-ethylenically unsaturated group;
$R^f$ is a fluoroalkyl group, or a perfluorpolyether group;
a is 0 to 2000;
b is 1 to 2000;
c is 2 to 2000,
with the proviso that a+b+c is at least 5.

7. The article according to claim 2, wherein $R^f$, is $C_nF_{2n+1}(CH_2O)_oC_mH_{2m}$—, $C_nF_{2n+1}CHXCF_2(C_mH_{2m}O)_oC_pH_{2p}$— or $C_nF_{2n+1}OCHXCF_2(C_mH_{2m}O)_oC_pH_{2p}$—
wherein X is H or F;
n is an integer of 1 to 12;
m is an integer of 1 to 12;
o is 0 or 1; and
p is an integer of 2 to 12.

8. The article according to claim 7, wherein $R^f$ is HFPO.

9. The article according to claim 2, wherein Z comprises $CH_2=CH$—, $CH_2=CHCO_2$-L-, or a combination thereof, wherein L is a linkage group.

10. The article according to claim 2, wherein the fluoroalkyl pendent siloxane compound is $(CH_2=CH)Si(Me)_2O$—$[Si(Me)(C_2H_4CF_3)$—$O]_b$—$Si(Me)_2(CH=CH_2)$, $(CH_2=CH)Si(Me)_2O$—$[(Si(Me)_2$-$O]_a$—$[Si(Me)(C_2H_4C_4F_9)$—$O]_b$—$Si(Me)_2(CH=CH_2)_2$, $(CH_2=CH)Si(Me)_2O$—$[Si(Me)_2$-$O]_a$—$[Si(Me)(C_2H_4CF_3)$—$O]_b$—$Si(Me)_2(CH=CH_2)$, $(CH_2=CH)Si(Me)_2O$—$[Si(Me)(C_2H_4C_4F_9)$—$O]_b$—$Si(Me)_2(CH=CH_2)$, or combinations thereof,
wherein
a is 0 to 2000;
b is 1 to 2000;
c is 2 to 2000,
with the proviso that a+b+c is at least 5.

11. The article according to claim 5, wherein the fluoroalkyl pendent siloxane compound is $(CH_2=CH)Si(Me)_2O$—$[Si(Me)_2$-$O]_a$—$[Si(Me)(C_2H_4C_4F_9)O]_b$—$[Si(Me)(CH=CH_2)$—$O]_c$—$Si(Me)_2(CH=CH_2)$, $(CH_2=CH)Si(Me)_2O$—$[Si(Me)_2$-$O]_a$—$[Si(Me)(C_2H_4CF_3)$—$O]_b$—$[Si(Me)(CH=CH_2)$—$O]_c$—$Si(Me)_2(CH=CH_2)$, $(Me)_3SiO$—$[Si(Me)_2$-$O]_a$—$[Si(Me)(C_2H_4CF_3)$—$O]_b$—$[Si(Me)(CH=CH_2)$—$O]_c$—$Si(Me)_3$, $(Me)_3SiO$—$[Si(Me)_2$-$O]_a$—$[Si(Me)(C_2H_4C_4F_9)$—$O]_b$—$[Si(Me)(CH=CH_2)$—$O]_c$—$Si(Me)_3$, $(Me)_3SiO$—$[Si(Me)(C_2H_4CF_3)$—$O]_b$—$[Si(Me)(CH=CH_2)$—$O]_c$—$Si(Me)_3$, $(Me)_3SiO$—$[Si(Me)(C_2H_4C_4F_9)$—$O]_b$—$[Si(Me)(C_2H_4CO_2C((Et)(CH_2OC(O)CH=CH_2)_2))$—$O]_c$—$Si(Me)_3$, $(Me)_3SiO$—$[Si(Me)(C_3H_6NHC(O)HFPO)$—$O]_b$—$[Si(Me)(C_2H_4CO_2C((Et)(CH_2OC(O)CH=CH_2)_2))$—$O]_c$—$Si(Me)_3$, $(Me)_3SiO$—$[Si(Me)(CH_2CH_2C(O)OC_2H_4OC(O)HFPO)$—$O]_b$—$[Si(Me)(C_2H_4CO_2C((Et)(CH_2OC(O)CH=CH_2)_2))$—$O]_c$—$Si(Me)_3$, $(Me)_3SiO$—$[Si(Me)(CH_2CHMeC(O)OC_2H_4OC(O)HFPO)$—$O]_b$—$[Si(Me)(C_2H_4CO_2C((Et)(CH2OC(O)CH=CH_2)_2))$—$O]_c$—$Si(Me)_3$, $(C_4F_9CH_2CH_2)Si(Me)_2O$—$[Si(Me)(C_2H_4C_4F_9)$—$O]_b$—$[Si(Me)(CH=CH_2)$—$O]_c$—$Si(Me)_2(CH_2CH_2C_4F_9)$, or combinations thereof, wherein
a is 0 to 2000;
b is 1 to 2000;
c is 2 to 2000,
with the proviso that a+b+c is at least 5.

12. The article according to claim 1, wherein the fluoroalkyl pendent siloxane is

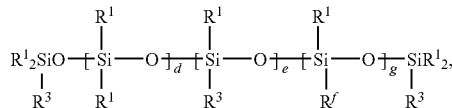

(Formula VI)

wherein $R^1$ is a monovalent, hydrocarbyl organic group;
$R^3$ is H or $R^1$;
$R^f$ is a fluoroalkyl group, or a perfluorpolyether group;
d is 0 to 2000;
e is 0 to 2000;
g is 1 to 2000;
with the proviso that d+e+g is at least 5, and at least two of said $R^3$ groups are H.

13. The article according to claim 12, wherein the at least one fluoroalkyl pendent siloxane compound is:

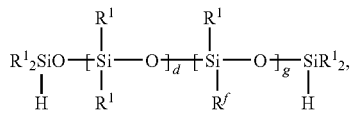

(Formula VII)

$R^1$ is a monovalent, hydrocarbyl organic group;
$R^f$ is a fluoroalkyl group, or a perfluorpolyether group;
d is 0 to 2000;
g is 1 to 2000,
with the proviso that d+g is at least 5.

14. The article according to claim 12, wherein the at least one fluoroalkyl pendent siloxane compound is:

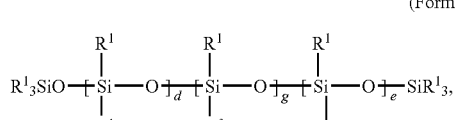

(Formula VIII)

$R^1$ is a monovalent hydrocarbyl organic group;
$R^f$ is a fluoroalkyl group, or a perfluorpolyether group;
d is 0 to 2000;
e is 0 to 2000;
g is 1 to 2000;
with the proviso that d+e+g is at least 5.

15. The article according to claim 12, wherein the at least one fluoroalkyl pendent siloxane compound is:

(Formula IX)

$$R^1{}_2SiO \underset{H}{\overset{R^1}{-}} \underset{R^1}{\overset{|}{Si}} -O \underset{d}{]} \underset{R^f}{\overset{R^1}{\overset{|}{Si}}} -O \underset{g}{]} \underset{H}{\overset{R^1}{\overset{|}{Si}}} -O \underset{e}{]} SiR^1{}_2,$$

$R^1$ is a monovalent; hydrocarbyl organic group;
d is 0 to 2000;
e is 0 to 2000;
g is 1 to 2000,
with the proviso that d+e+g is at least 5.

16. The article according to claim 12, wherein the at least one fluoroalkyl pendent siloxane compound is:

(Formula X)

$$R^1{}_2SiO \underset{R^f}{\overset{R^1}{-}} \underset{R_1}{\overset{|}{Si}} -O \underset{d}{]} \underset{R^f}{\overset{R^1}{\overset{|}{Si}}} -O \underset{g}{]} \underset{H}{\overset{R^1}{\overset{|}{Si}}} -O \underset{e}{]} \underset{R^f}{\overset{}{SiR^1{}_2}},$$

$R^1$ is a monovalent, hydrocarbyl organic group;
$R^f$ is a fluoroalkyl group, or a perfluorpolyether group;
d is 0 to 2000;
e is 0 to 2000;
g is 1 to 2000,
with the proviso that d+e+g is at least 5.

17. The article according to claim 12, wherein $R^f$, is $C_nF_{2n+1}(CH_2O)_oC_pH_{2p}-$, $C_nF_{2n+1}CHXCF_2(C_mH_{2m}O)_oC_pH_{2p}-$, or $C_nF_{2n+1}OCHXCF_2(C_mH_{2m}O)_oC_pH_{2p}-$ wherein X is H or F;
n is an integer of 1 to 12;
m is an integer of 1 to 12;
o is 0 or 1; and
p is an integer of 2 to 12.

18. The article according to claim 12, wherein $R^f$ is HFPO.

19. The article according to claim 12, wherein the fluoroalkyl pendent siloxane is $(Me)_2SiH-O-[Si(Me)(H)-O]_e-[Si(Me)(C_2H_4CF_3)-O]_g-SiH(Me)_2$, $(Me)_2SiH-O-[Si(Me)(H)-O]_e-[Si(Me)(C_2H_4C_4F_9)-O]_g-SiH(Me)_2$, $(Et)_2SiH-O-[Si(Et)(H)-O]_e-[Si(Me)(C_2H_4CF_3)-O]_g-SiH(Et)_2$, $(Et)_2SiH-O-[Si(Et)(H)-O]_e[Si(Me)(C_2H_4C_4F_9)-O]_g-SiH(Et)_2$, $(Me)_2SiH-O-[Si(Me)(H)-O]_e-[Si(Me)(C_2H_4CF_3)-O]_g-[Si(Me)_2-O]_d-SiH(Me)_2$, $(Me)_2SiH-O-[Si(Me)(H)-O]_e-[Si(Me)(C_2H_4C_4F_9)-O]_g-[Si(Me)_2-O]_d-SiH(Me)_2$, $(Me)_2SiH-O-[Si(Me)(H)-O]_e-[Si(Me)(C_2H_4CF_3)-O]_g-[Si(Me)(Ph)-O]_d-SiH(Me)_2$, $(Me)_2SiH-O-[Si(Me)(H)-O]_e-[Si(Me)(C_2H_4C_4F_9)-O]_g-[Si(Me)(Ph)-O]_d-SiH(Me)_2$, $(Me)_3Si-O-[Si(Me)(H)-O]_e-[Si(Me)(C_2H_4CF_3)-O]_g-Si(Me)_3$, $(Me)_3Si-O-[Si(Me)(H)-O]_e-[Si(Me)(C_2H_4C_4F_9)-O]_g-Si(Me)_3$, $(Me)_3Si-O-[Si(Me)(H)-O]_e-[Si(Me)(C_2H_4CF_3)-O]_g-[Si(Me)_2-O]_d-Si(Me)_3$, $(Me)_3Si-O-[Si(Me)(H)-O]_e-[Si(Me)(C_2H_4C_4F_9)-O]_g-[Si(Me)_2-O]_d-Si(Me)_3$, $(Me)_3Si-O-[Si(Me)(H)-O]_e-[Si(Me)(C_2H_4CF_3)-O]_g-[Si(Me)(Ph)-O]_d-Si(Me)_3$, $(Me)_3Si-O-[Si(Me)(H)-O]_e-[Si(Me)(C_2H_4C_4F_9)-O]_g-[Si(Me)(Ph)-O]_d-Si(Me)_3$, $(Me)_3Si-O-[Si(Me)(H)-O]_e-[Si(Me)(CH_2C(H)(Me)C(O)OC_2H_4OC(O)HFPO)-O]_g-[Si(Me)_2-O]_d-Si(Me)_3$, $(Me)_3Si-O-[Si(Me)(H)-O]_e-[Si(Me)(C_3H_6NHC(O)HFPO)-O]_g-[Si(Me)_2-O]_d-Si(Me)_3$, $(C_4F_9CH_2CH_2)Si(Me)_2-O-[Si(Me)(C_2H_4C_4F_9)-O]_b-[Si(Me)(H)-O]_c-Si(Me)_2(CH_2CH_2C_4F_9)$, or combinations thereof, wherein
d is 0 to 2000;
e is 0 to 2000;
g is 1 to 2000,
with the proviso that d+e+g is at least 5.

20. The article according to claim 12, wherein the mixture further comprises a hydrosilylation catalyst.

21. The article according to claim 1, wherein the at least one fluoroalkyl pendent siloxane comprises:

(Formula XI)

$$R^1{}_2SiO \underset{R^2}{\overset{R^1}{-}} \underset{}{\overset{|}{Si}O} \underset{a}{]} \underset{R^1}{\overset{R^7}{\overset{|}{Si}O}} \underset{b}{]} SiR^1{}_2; \text{ and}$$

(Formula XII)

$$R^1{}_2SiO \underset{R^3}{\overset{R^1}{-}} \underset{R^1}{\overset{|}{Si}} -O \underset{d}{]} \underset{R^3}{\overset{R^1}{\overset{|}{Si}}} -O \underset{e}{]} \underset{R^7}{\overset{R^1}{\overset{|}{Si}}} -O \underset{g}{]} \underset{R^3}{\overset{}{SiR^1{}_2}},$$

wherein $R^1$ is a monovalent, hydrocarbyl organic group;
$R^2$ is $R^1$ or an ethylenically or multi-ethylenically unsaturated group Z;
$R^3$ is H or $R^1$;
$R^7$ is $R^1$ or $R^f$;
$R^f$ is a fluoroalkyl group, or a perfluorpolyether group;
a is 0 to 2000;
b is 1 to 2000;
d is 0 to 2000;
e is 0 to 2000;
g is 1 to 2000,
with the proviso that d+e+g is at least 5, a+b is at least 5, at least one $R^7$ is $R^f$, at least two $R^2$ are Z, and at least two $R^3$ are H.

22. The article according to claim 21, wherein the mixture further comprises a hydrosilylation catalyst.

23. The article according to claim 1 wherein the mixture further comprises at least one compound having the following formula:

(Formula XIII)

$$CH_2{=}\underset{R^4}{\overset{}{C}}{-}\overset{O}{\overset{\|}{C}}{-}R^5{-}Y$$

wherein $R^4$ is hydrogen, a $C_1$ to $C_4$ alkyl group, or a phenyl group;
Y is a functional group for improving the bonding or adhesion of the curable composition to a substrate; and
$R^5$ is a divalent linking group that joins a (meth)acryloyl group to Y.

24. The article according to claim 1, wherein the infrared light absorbing particle is antimony tin oxide.

25. The article according to claim 1 further comprising and adhesive layer.

26. A light control article for blocking infrared light from an infrared light source comprising:
- an infrared light reflecting multilayer film having alternating layers of a first polymer type and a second polymer type;
- a hardcoat layer disposed on the multilayer film, wherein said hardcoat layer comprises the reaction product of a hardcoat composition, the hardcoat composition comprising:
  - at least one organic polyethylenically unsaturated compound;
  - at least one fluoroalkyl pendent siloxane compound;
  - infrared light absorbing nanoparticles; and
  - at least one polymerization initiator; and
- a substrate disposed adjacent the infrared light reflecting multilayer film.

27. The light control article according to claim 26 further comprising a pressure sensitive adhesive layer disposed between the infrared light reflecting multilayer film and the glass substrate.

28. The light control article according to claim 26 further comprising a tear resistant polymeric film.

29. The light control article according to claim 26, wherein the hardcoat layer has a thickness in a range from 1 to 20 micrometers.

30. The light control article according to claim 26 wherein the substrate comprises an optical display.

* * * * *